United States Patent
O'Connor

(10) Patent No.: US 9,851,853 B2
(45) Date of Patent: Dec. 26, 2017

(54) LOW POWER SCAN FOR DEVICE WAKE UP AND UNLOCK

(71) Applicant: Apple Inc., Cupertino, CA (US)

(72) Inventor: Sean Erik O'Connor, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 389 days.

(21) Appl. No.: 14/472,184

(22) Filed: Aug. 28, 2014

(65) Prior Publication Data

US 2015/0346903 A1    Dec. 3, 2015

Related U.S. Application Data

(63) Continuation-in-part of application No. 14/292,736, filed on May 30, 2014.

(51) Int. Cl.
*G06F 3/041* (2006.01)
*G06F 3/044* (2006.01)
*G06G 5/00* (2006.01)
*G09G 5/18* (2006.01)
*G09G 5/00* (2006.01)
*G06F 21/00* (2013.01)

(52) U.S. Cl.
CPC ............ *G06F 3/044* (2013.01); *G06F 3/0416* (2013.01); *G06F 21/00* (2013.01); *G09G 5/003* (2013.01); *G09G 5/18* (2013.01); *G09G 2330/021* (2013.01)

(58) Field of Classification Search
None
See application file for complete search history.

(56) References Cited

U.S. PATENT DOCUMENTS 5,483,261 A    1/1996   Yasutake
5,488,204 A    1/1996   Mead et al.
(Continued)

FOREIGN PATENT DOCUMENTS

JP    2000-163031 A    6/2000
JP    2002-342033 A    11/2002

OTHER PUBLICATIONS

Non-Final Office Action dated Jul. 13, 2015, for U.S. Appl. No. 14/292,736, filed May 30, 2014, nine pages.
(Continued)

*Primary Examiner* — Carolyn R Edwards
*Assistant Examiner* — Krishna Neupane
(74) *Attorney, Agent, or Firm* — Morrison & Foerster LLP

(57) ABSTRACT

A low power can for device wake up and unlock is disclosed. The low power scan can include one or more algorithms used to detect a sequence and/or one or more gestures to wake up a processor and unlock the device. A sequence and/or one or more gestures can be determined by a microcontroller and/or by a separate hardware component. The microcontroller can send a notification to the processor and/or switch the device from an idle to an active state. By detecting the sequence and gestures in the microcontroller before waking up the processor, the battery life can be extended. In some examples, the microcontroller can determine if the sequence and gestures are due to water splashes, water film, and/or noise. In such examples, the microcontroller can reject the touch without waking up the processor, and further extending the battery life of the device.

18 Claims, 26 Drawing Sheets

(56) References Cited

U.S. PATENT DOCUMENTS

| | | |
|---|---|---|
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,476,797 B1 | 11/2002 | Kurihara et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,174,503 B2 | 5/2012 | Chin |
| 8,479,122 B2 | 7/2013 | Hotelling et al. |
| 2006/0197753 A1 | 9/2006 | Hotelling |
| 2007/0152966 A1 | 7/2007 | Krah et al. |
| 2008/0158185 A1* | 7/2008 | Westerman ........... G06F 3/0488 345/173 |
| 2010/0253639 A1 | 10/2010 | Huang et al. |
| 2010/0289754 A1 | 11/2010 | Sleeman et al. |
| 2011/0316797 A1 | 12/2011 | Johansson |
| 2012/0191993 A1* | 7/2012 | Drader ................. G06F 1/3215 713/320 |
| 2012/0249431 A1 | 10/2012 | Li |
| 2013/0002579 A1 | 1/2013 | Hatano |
| 2014/0015763 A1 | 1/2014 | Woolley et al. |
| 2014/0055410 A1 | 2/2014 | Nakajima et al. |
| 2014/0104225 A1 | 4/2014 | Davidson et al. |
| 2014/0267104 A1* | 9/2014 | Ahmed .................. G06F 3/041 345/173 |
| 2014/0267133 A1* | 9/2014 | Steuer ................ G01R 27/2605 345/174 |
| 2015/0130742 A1 | 5/2015 | Chen |
| 2015/0185924 A1* | 7/2015 | Chang ..................... G06F 3/044 345/174 |
| 2015/0242053 A1* | 8/2015 | Gao ....................... G06F 3/0414 345/178 |
| 2015/0346895 A1 | 12/2015 | Bokma et al. |

OTHER PUBLICATIONS

Final Office Action dated Apr. 8, 2016, for U.S. Appl. No. 14/292,736, filed May 30, 2014, 23 pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Non-Final Office Action dated Jan. 3, 2017, for U.S. Appl. No. 14/292,736, filed May 30, 2014, 26 pages.

* cited by examiner

| SENSING POINT | VALUE |
|---|---|
| D2, S2 | 25 |

| SENSING POINT | CORRECTED VALUE |
|---|---|
| D2, S2 | 20 |

| SENSING POINT | VALUE |
| --- | --- |
| D0,S0 | 5 |
| D0,S1 | 80 |
| D0,S2 | 80 |
| D0,S3 | 80 |
| D0,S4 | 5 |
| D1,S0 | 80 |
| D1,S1 | 80 |
| D1,S2 | 80 |
| D1,S3 | 80 |
| D1,S4 | 80 |
| D2,S0 | 80 |
| D2,S1 | 80 |
| D2,S2 | 80 |
| D2,S3 | 80 |
| D2,S4 | 80 |
| D3,S0 | 80 |
| D3,S1 | 80 |
| D3,S2 | 80 |
| D3,S3 | 80 |
| D3,S4 | 80 |
| D4,S0 | 5 |
| D4,S1 | 80 |
| D4,S2 | 80 |
| D4,S3 | 80 |
| D4,S4 | 5 |

*FIG. 5B*

| SENSING POINT | VALUE |
|---|---|
| D0,S0 | 0 |
| D0,S1 | 75 |
| D0,S2 | 75 |
| D0,S3 | 75 |
| D0,S4 | 0 |
| D1,S0 | 75 |
| D1,S1 | 75 |
| D1,S2 | 75 |
| D1,S3 | 75 |
| D1,S4 | 75 |
| D2,S0 | 75 |
| D2,S1 | 75 |
| D2,S2 | 75 |
| D2,S3 | 75 |
| D2,S4 | 75 |
| D3,S0 | 75 |
| D3,S1 | 75 |
| D3,S2 | 75 |
| D3,S3 | 75 |
| D3,S4 | 75 |
| D4,S0 | 0 |
| D4,S1 | 75 |
| D4,S2 | 75 |
| D4,S3 | 75 |
| D4,S4 | 0 |

*FIG. 5C*

| SENSING POINT | VALUE |
|---|---|
| D0,S0 | 0 |
| D0,S4 | 0 |
| D4,S0 | 0 |
| D4,S4 | 0 |
| D0,S1 | 75 |
| D0,S2 | 75 |
| D0,S3 | 75 |
| D1,S0 | 75 |
| D1,S1 | 75 |
| D1,S2 | 75 |
| D1,S3 | 75 |
| D1,S4 | 75 |
| D2,S0 | 75 |
| D2,S1 | 75 |
| D2,S2 | 75 |
| D2,S3 | 75 |
| D2,S4 | 75 |
| D3,S0 | 75 |
| D3,S1 | 75 |
| D3,S2 | 75 |
| D3,S3 | 75 |
| D3,S4 | 75 |
| D4,S1 | 75 |
| D4,S2 | 75 |
| D4,S3 | 75 |

*FIG. 5D*

| SENSING POINT | CORRECTED VALUE |
|---|---|
| D0,S0 | 5 |
| D0,S1 | 5 |
| D0,S2 | 5 |
| D0,S3 | 5 |
| D0,S4 | 5 |
| D1,S0 | 5 |
| D1,S1 | 5 |
| D1,S2 | 75 |
| D1,S3 | 5 |
| D1,S4 | 5 |
| D2,S0 | 5 |
| D2,S1 | 75 |
| D2,S2 | 100 |
| D2,S3 | 75 |
| D2,S4 | 5 |
| D3,S0 | 5 |
| D3,S1 | 5 |
| D3,S2 | 75 |
| D3,S3 | 5 |
| D3,S4 | 5 |
| D4,S0 | 5 |
| D4,S1 | 5 |
| D4,S2 | 5 |
| D4,S3 | 5 |
| D4,S4 | 5 |

*FIG. 6B*

| SENSING POINT | CORRECTED VALUE |
|---|---|
| D0,S0 | 0 |
| D0,S1 | 0 |
| D0,S2 | 0 |
| D0,S3 | 0 |
| D0,S4 | 0 |
| D1,S0 | 0 |
| D1,S1 | 0 |
| D1,S2 | 70 |
| D1,S3 | 0 |
| D1,S4 | 0 |
| D2,S0 | 0 |
| D2,S1 | 70 |
| D2,S2 | 95 |
| D2,S3 | 70 |
| D2,S4 | 0 |
| D3,S0 | 0 |
| D3,S1 | 0 |
| D3,S2 | 70 |
| D3,S3 | 0 |
| D3,S4 | 0 |
| D4,S0 | 0 |
| D4,S1 | 0 |
| D4,S2 | 0 |
| D4,S3 | 0 |
| D4,S4 | 0 |

*FIG. 6C*

| SENSING POINT | CORRECTED VALUE |
|---|---|
| D1,S2 | 70 |
| D2,S1 | 70 |
| D2,S2 | 95 |
| D2,S3 | 70 |
| D3,S2 | 70 |

| SENSING POINT | CORRECTED VALUE |
|---|---|
| D0,S0 | 0 |
| D0,S1 | 0 |
| D1,S0 | 0 |
| D1,S1 | 0 |
| D2,S0 | 0 |
| D2,S1 | 0 |
| D2,S3 | 0 |
| D2,S4 | 0 |
| D3,S0 | 0 |
| D3,S1 | 0 |
| D3,S2 | 0 |
| D3,S3 | 0 |
| D3,S4 | 0 |
| D4,S0 | 0 |
| D4,S1 | 0 |
| D4,S2 | 0 |
| D4,S3 | 0 |
| D4,S4 | 0 |
| D2,S2 | 15 |
| D0,S2 | 20 |
| D0,S4 | 40 |
| D0,S3 | 50 |
| D1,S2 | 60 |
| D1,S4 | 60 |
| D1,S3 | 75 |

*FIG. 10B*

LOW POWER SCAN FOR DEVICE WAKE UP AND UNLOCK

FIELD OF THE DISCLOSURE

This relates generally to touch sensitive devices, and in particular, to a low power scan mode for waking up and unlocking touch sensitive devices.

BACKGROUND OF THE DISCLOSURE

Portable electronic devices, such as mobile telephones, media players and wearable devices can operate using a battery as a source of power. The battery can have a limited amount of power and lifetime before recharging. Therefore, portable electronic devices can have stringent power consumption requirements to make sure that they are able to power the device for an adequate amount of time, without requiring big and heavy batteries to do so. To conserve battery power, it may be beneficial to reduce the power consumption of applications, reduce computing complexity and provide full functionality (and a resultant increase in power consumption) only when necessary.

SUMMARY

This relates to a low power scan for device wake up and unlock. The low power scan can include one or more algorithms used to detect a sequence and/or one or more gestures to wake up a processor and unlock the device for user interaction. A sequence and/or one or more gestures can be determined by a microcontroller and/or by a separate hardware component. The microcontroller can send a notification or a wake signal to the processor. The notification can wake the processor, and the processor can unlock the device and/or power on one or more components. By determining whether to unlock the device and/or switch the device from an idle state to an active state in the microcontroller before powering on or waking up the processor, the amount of power consumed can be reduced, and the battery life can be extended. In some examples, the one or more algorithms can include logic to prevent false wake ups from artifacts, such as a water splash, a water film, or noise, generating a touch signal.

BRIEF DESCRIPTION OF THE DRAWINGS

FIGS. 5B-5D illustrate exemplary values for unlocking a device by rejecting a presence of an object covering the device surface using a low power scan according to examples of the disclosure.

FIGS. 6B-6D illustrate exemplary values for unlocking a device by detecting a presence of a finger using a low power scan according to examples of the disclosure.

FIG. 6E illustrates an exemplary process for unlocking a device by detecting a presence of a finger using a low power scan according to examples of the disclosure.

FIG. 10B illustrates exemplary values for a water splash located on a touch screen according to examples of the disclosure.

DETAILED DESCRIPTION

Figures 1A, 1B, 1C:
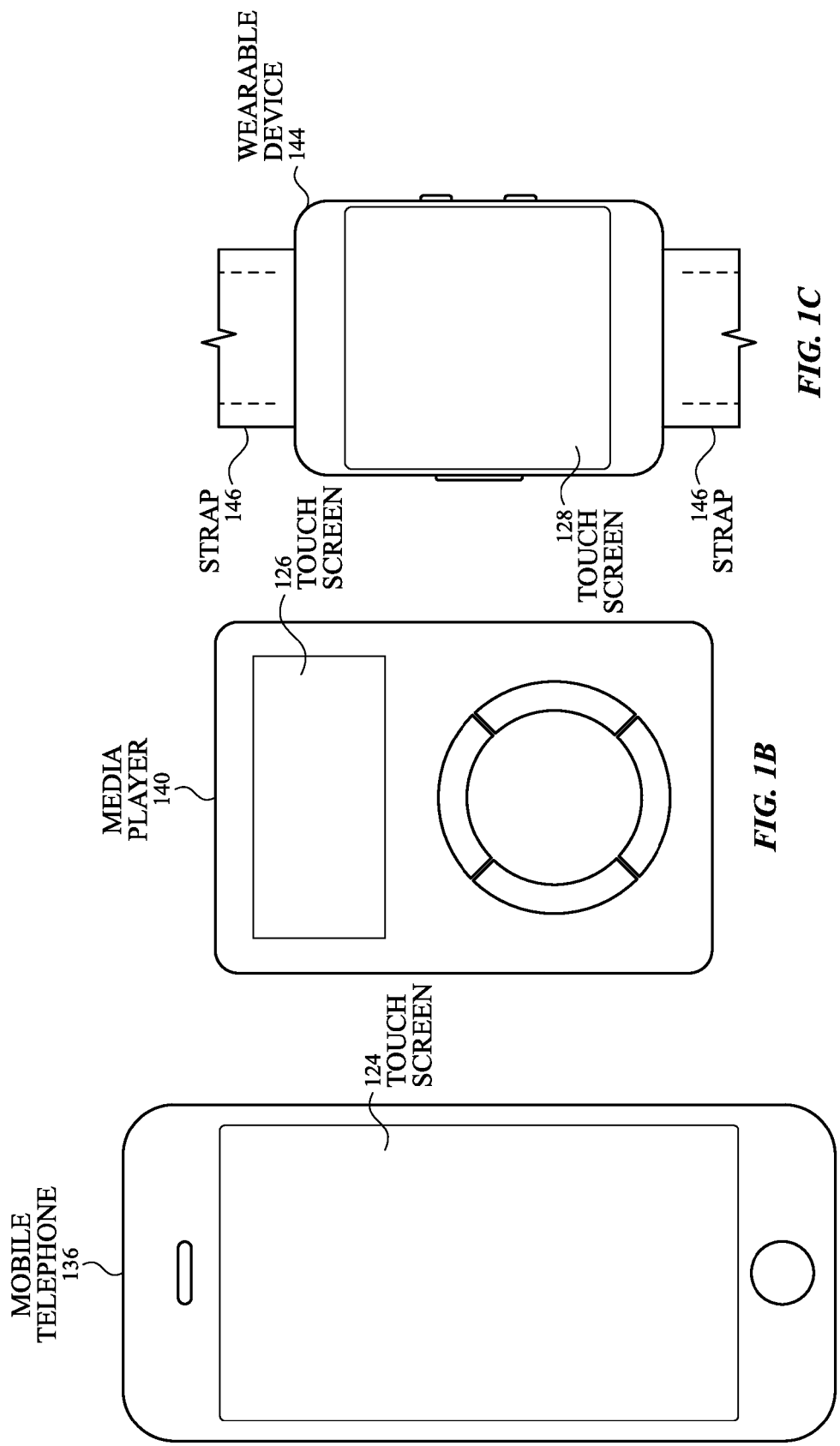
FIGS. 1A-1C illustrate systems in which examples of the disclosure can be implemented.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modification thereto, does not imply that the illustrated process or any of its steps are necessary to one or more of the examples, and does not imply that the illustrated process is preferred.

Touch-sensitive screens ("touch screens" or "touchscreens") can be used in many electronic devices to display graphics and text, and to provide a user interface through which a user may interact with the devices. A touch screen can detect and respond to contact on the touch screen. A device can display one or more soft keys, menus, and other user-interface objects on the touch screen. A user may interact with the device by contacting the touch screen at locations corresponding to the user-interface object with which the user wishes to interact.

Touch screens can be included in portable electronic devices, such as laptops, tablet computing devices, cellular telephones, media players, gaming devices, handheld devices, miniature devices, wearable devices, etc. In recent years, these electronics devices have become small, light, powerful, and more user-friendly. These electronic devices generally operate using some form of battery power. Batteries, however, can only provide a limited amount of power for a limited amount of time before being drained. Therefore, portable electronic devices can have stringent power requirements to make sure that they are able to power the device for an adequate amount of time, without requiring big and heavy batteries to do so.

To conserve battery power, the device can have several operating states. Each state can be associated with a level of availability of the computing device, and each state can have a related amount of power consumed. For example, the device can be in an active state with a relatively higher power consumption. Other states can include, but are not limited to, a sleep state and a standby state, with lower power consumption.

In an idle state (e.g., sleep state or standby state), some or all of the components (such as a processor) can be powered down, and the device can be idle. To unlock the device or to switch the device from an idle state to an active state, any number of unlocking procedures, such as pressing a sequence of on-screen buttons or performing one or more gestures (simultaneously or sequentially), can be used. The sequence and/or gestures can be detected by using a series of processing steps including a watershed algorithm to determine the boundaries of one or more touch regions, calculating the centroid of each region, transferring the information to the processor, and then performing tap and event gesturing parsing. However, these series of processing steps can be complex and can involve a significant amount of processing power and hence, can consume a significant amount of battery life.

This disclosure relates to a low power scan for device wake up and unlock. The low power scan can include one or more algorithms used to detect a sequence and/or one or more gestures to wake up the processor and unlock the device for user interaction. A sequence and/or one or more gestures can be determined by a controller, such as a microcontroller or touch controller, and/or by a separate hardware component. The controller can send a notification or a wake signal to the processor. The notification can wake the processor, and the processor can unlock the device and/or power on one or more components. By making the determination whether to unlock the device and/or switch the device from an idle state to an active state in the controller before powering on or waking up the processor, the amount of power consumed can be reduced, and the battery life can be extended.

Representative applications of methods and apparatus according to the present disclosure are described in this section. These examples are being provided solely to add context and aid in the understanding of the described examples. It will thus be apparent to one skilled in the art that the described examples may be practiced without some or all of the specific details. In other instances, well-known process steps have been described in detail in order to avoid unnecessarily obscuring the described examples. Other applications are possible, such that the following examples should not be taken as limiting.

FIGS. 1A-1C illustrate systems in which examples of the disclosure can be implemented. FIG. 1A illustrates an exemplary mobile telephone 136 that can include a touch screen 124. FIG. 1B illustrates an exemplary media player 140 that can include a touch screen 126. FIG. 1C illustrates an exemplary wearable device 144 that can include a touch screen 128 and can be attached to a user using a strap 146. The systems of FIGS. 1A-1C can utilize the one or more low power scan and detection mechanisms for device wake up and unlock as will be disclosed.

The one or more devices as illustrated in FIGS. 1A-1C can have several operating states that can range from fully on (e.g., active state) when a central processing unit (CPU)

can be powered on and operational, to a CPU stop state where the CPU can be powered off but a software state can be saved in random access memory (RAM), to a very low power state (e.g., sleep state) where the software state can be saved in a non-volatile memory (such as a hard drive) and then the memory and CPU can be powered off, though the disclosure is not limited to just these states. Some operating states can consume relatively more power than others can. Often times, to help conserve energy (and battery life for portable electronic devices), the portable electronic devices can switch to a lower powered state, such as a standby state or a sleep state, when user interaction is reduced or temporarily absent. In some examples, a standby state can consume more power than a sleep state. In a sleep state, substantially all of the device components can be powered down. In a standby state, one or more components can be powered down, while one or more components can be fully or partially on. For example, in a standby state, a touch panel and display can be powered down while a wireless transceiver can be fully on. The device can continue to receive messages or data through the Internet while the user is not interacting with the device.

When a device is in an active state and user interaction is reduced or temporarily absent, the device can include a timer. The timer can monitor or track the amount of time until a user interaction is received. If a certain amount of time has elapsed since a user interaction has been received, the device can automatically switch to an idle state. In some examples, the user can force the device to enter the idle state. When the user wishes to interact with the device and/or switch the device from an idle state to an active state, the user can "unlock" the device by pressing a sequence of one or more buttons or performing one or more gestures (simultaneously or sequentially).

Figure 2A:
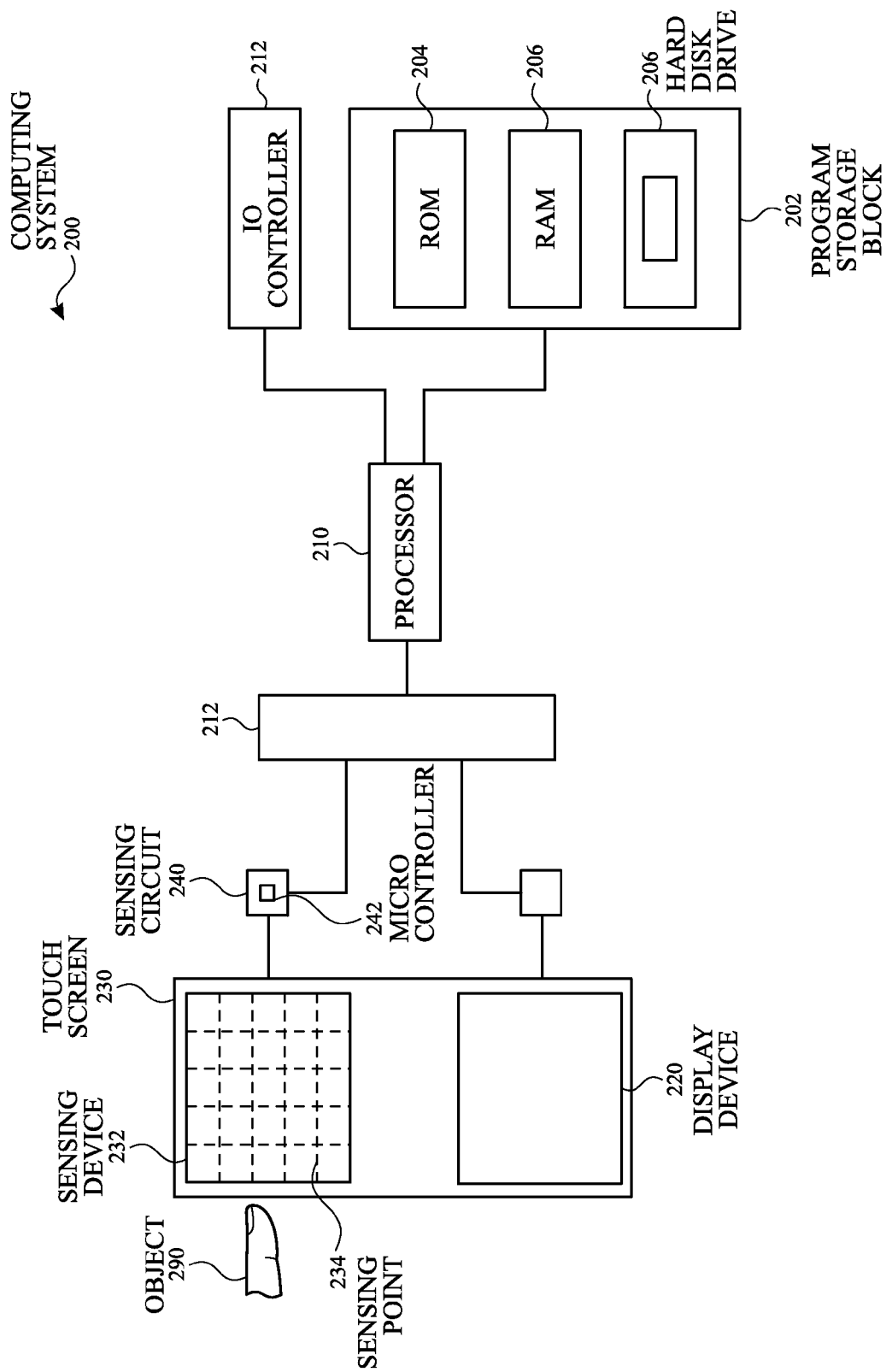
FIG. 2A illustrates an exemplary block diagram of a computing system for detecting or scanning a touch surface for a sequence and/or one or more gestures.
Figure 2B:
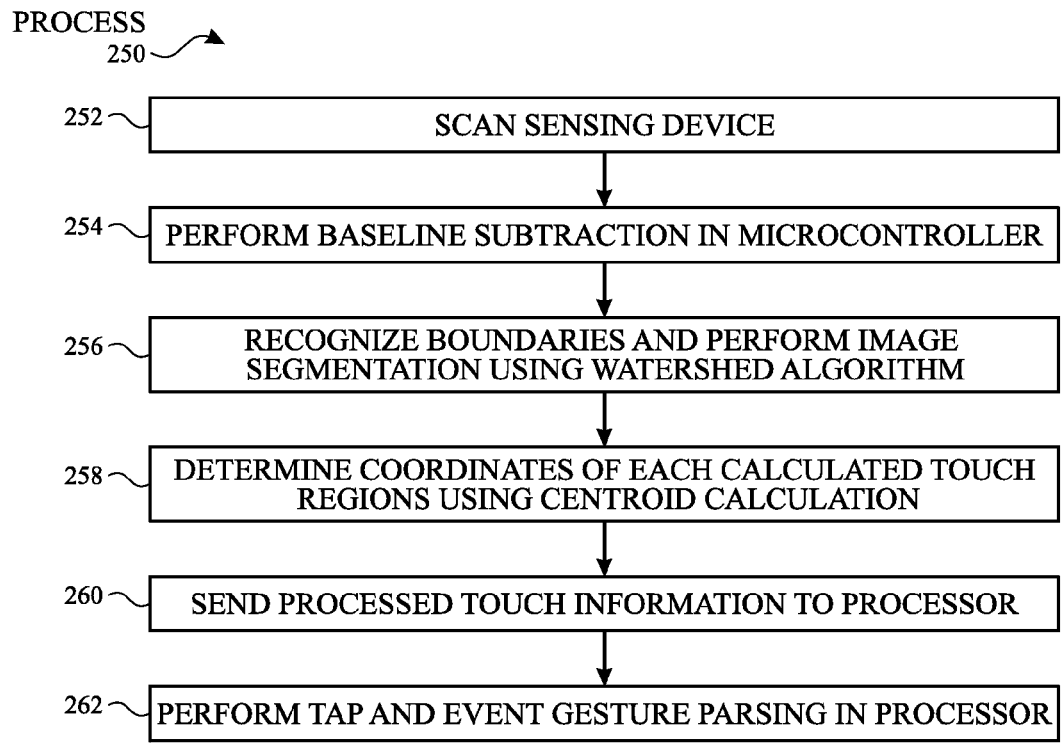
FIG. 2B illustrates an exemplary process for detecting or scanning a touch surface for a sequence and/or one or more gestures.

FIG. 2A illustrates an exemplary block diagram of a computing system, and FIG. 2B illustrates an exemplary process for detecting or scanning a touch surface for a sequence or one or more gestures. Computing system 200 can correspond to any of the computing devices illustrated in FIGS. 1A-1C. Additionally, computing system 200 can also correspond to public computer systems such as information kiosks, automated teller machines (ATM), point of sale machines (POS), industrial machines, gaming machines, arcade machines, vending machines, airline e-ticket terminals, restaurant reservation terminals, customer service stations, library terminals, learning devices, and the like.

Computing system 200 can include a processor 210 configured to execute instructions and to carry out operations associated with computing system 200. For example, using instructions retrieved from memory, processor 210 can control the reception and manipulation of input and output data between components of the computing system 200. Processor 210 can be a single-chip processor or can be implemented with multiple components.

In some examples, processor 210 together with an operating system can operate to execute computer code and produce and use data. The computer code and data can reside within a program storage block 202 that can be operatively coupled to the processor 210. Program storage block 202 can generally provide a place to hold data that is being used by the computing system 200. By way of example, the program storage block 202 can include Read-Only Memory (ROM) 204, Random-Access Memory (RAM) 206, hard disk drive 208 and/or the like. The computer code and data could also reside on a removable storage medium and loaded or installed onto the computing system 200 when needed. Removable storage mediums include, for example, CD-ROM, DVD-ROM, Universal Serial Bus (USB), Secure Digital (SD), Compact Flash (CF), Memory Stick, Multi-Media Card (MMC) and a network component.

Computing system 200 can also include an input/output (I/O) controller 212 that can be operatively coupled to processor 210 or it may be a separate component as shown. The I/O controller 212 can be configured to control interactions with one or more I/O devices. The I/O controller 212 can operate by exchanging data between the processor 210 and the I/O devices that desire to communicate with the processor 210. The I/O devices and the I/O controller 212 typically communicate through a data link. The data link may be a one way link or a two way link. In some cases, I/O devices can be connected to the I/O controller 212 through wireless connections. By way of example, a data link can correspond to PS/2, USB, Firewire, IR, RF, Bluetooth or the like.

Computing system 200 can include a display device 220 that can be operatively coupled to processor 210. Display device 220 can be a separate component (peripheral device) or may be integrated with the processor 210 and program storage block 202 to form a desktop computer (all in one machine), a laptop, handheld or tablet computing device or the like. Display device 220 can be configured to display a graphical user interface (GUI) including perhaps a pointer or cursor as well as other information to the user. By way of example, display device 220 can be any type of display including liquid crystal displays (LCDs), electroluminescent displays (ELDs), field emission displays (FEDs), light emitting diode displays (LEDs), organic light emitting diode displays (OLEDs) or the like.

Computing system 200 can also include a touch screen 230 that can be operatively coupled to processor 210. Touch screen 230 can be the combination of sensing device 232 and display device 220, where the sensing device 232 can be a transparent panel that is positioned in front of the display device 220 or integrated with the display device. In some cases, touch screen 230 can recognize touches and the position and magnitude of touches on its surface. Touch screen 230 can report the touches to processor 210, and the processor can interpret the touches in accordance with its programming. For example, processor 210 can perform tap and event gesture parsing and can initiate a wake of the device or powering on one or more components in accordance with a particular touch.

In some examples, the touch screen 230 can be capable of tracking multiple objects, which rest on, tap on, or move across the touch sensitive surface of the touch screen. The touch screen 230 can include a sensing device 232 configured to detect an object in close proximity thereto and/or the pressure exerted thereon. The sensing device 232 can be divided into several independent and spatially distinct sensing electrodes, nodes or intersections 234 that are positioned throughout. Sensing electrodes 234 can be dispersed about the touch screen 230 with each sensing electrode 234 representing a different position on the surface of the touch screen 230 (or touch screen plane). The sensing electrodes 234 can be positioned in a grid or a pixel array where each pixilated sensing electrode 234 can be capable of generating a signal at a same time. In the simplest case, a signal can be produced each time an object is positioned over a sensing electrode 234. When an object is placed over multiple sensing electrodes 234 or when the object is moved between or over multiple sensing electrodes 234, multiple signals can be generated.

The number and configuration of the sensing electrodes 234 can be widely varied. The number of sensing electrodes 234 can depend on the desired sensitivity as well as the desired transparency of the touch screen 230. More nodes or sensing electrodes 234 generally increases sensitivity, but reduces transparency (and vice versa). With regard to configuration, the sensing electrodes 234 can map the touch screen plane into a coordinate system such as a Cartesian coordinate system, a Polar coordinate system or some other coordinate system. When a Cartesian coordinate system is used (as shown), the sensing electrodes 234 can correspond to x and y coordinates. When a Polar coordinate system is used, the sensing electrodes can correspond to radial (r) and angular coordinates (θ).

Touch screen 230 can be coupled to a touch controller or sensing circuit 240 that can acquire data from the touch screen and can supply the acquired data to the processor 210. In some cases, the sensing circuit 240 can be configured to send raw data to the processor 210 so that the processor 210 processes the raw data. For example, the processor 210 can receive data from the sensing circuit 240 and can determine how to interpret the data. The data can include the coordinates in each sensing electrode 234 as well as the pressure exerted on each sensing electrode 234. In some examples, sensing circuit 240 can be configured to process the raw data itself. That is, the sensing circuit 240 can read the signals from the sensing electrodes 234 and turn them into data that the processor 210 can understand. Sensing circuit 240 can perform filtering and/or conversion processes. Filtering processes can be implemented to reduce a busy data stream to prevent the processor 210 from being overloaded with redundant or non-essential data. The conversion processes can be implemented to adjust the raw data before sending or reporting them to the processor 210. The conversion can include determining the center point for each touch region (e.g., centroid).

The sensing circuit 240 can include one or more microcontrollers, each of which monitors one or more sensing electrodes 234. The microcontrollers can, for example, correspond to an application specific integrated circuit (ASIC), which works with firmware to monitor the signals from the sensing device 232 and to process the monitored signals and to report this information to the processor 210.

In some examples, sensing device 232 is based on capacitance. When two electrically conductive members come close to one another without actually touching, their electric fields can interact to form a capacitance. The first electrically conductive member can be a sensing electrode 234 and the second electrically conductive member can be an object 290 such as a finger. As the object 290 approaches the surface of the touch screen 230, a capacitance can form between the object 290 and the sensing electrodes 234 in close proximity to object 290. By detecting changes in capacitance at each of the sensing electrodes 234 and noting the position of the sensing electrodes 234, the sensing circuit 240 can recognize multiple objects, and determine the location, pressure, direction, speed and acceleration of the objects 290 as they move across the touch screen 230. For example, the sensing circuit 240 can determine whether the sensed touch is a finger, tap, or an object covering the surface.

The sensing device 232 can be based on self-capacitance or mutual capacitance. In self-capacitance, each of the sensing electrodes 234 can be provided by an individual charged electrode. As an object approaches the surface of the touch screen 230, the object capacitively couples to those electrodes in close proximity to the object, thereby stealing charge away from the electrodes. The amount of charge in each of the electrodes can be measured by the sensing circuit 240 to determine the positions of multiple objects when they touch the touch screen 230. In mutual capacitance, the sensing device 232 can include a two layer grid of spatially separated lines or wires, although other configurations are possible. The upper layer can include lines in rows while the lower layer can include lines in columns (e.g., orthogonal). The sensing electrodes 234 can be provided at the intersections of the rows and columns. During operation, the rows can be charged, and the charge can be capacitively coupled from the rows to the columns. As an object approaches the surface of the touch screen 230, the object capacitively couples to the rows in close proximity to the object, thereby reducing the charge coupling between the rows and columns. The amount of charge in each of the columns can be measured by the sensing circuit 240 to determine the position of multiple objects when they touch the touch screen 230.

FIG. 2B illustrates an exemplary process for unlocking a device by detecting a sequence or one or more gestures. Process 250 can include scanning sensing device 232 in step 252. Object 290 can touch the touch surface, and sensing device 232 can form a touch "image." The microcontroller 242 in the sensing circuit 240 can receive the signals or capacitance values from the sensing device 232, and can perform a baseline subtraction on the signals in step 254. In step 256, the microcontroller can determine the boundaries of the touch image using a watershed algorithm. Generally speaking, the watershed algorithm can perform image segmentation, which can partition the image into distinct regions as, for example, the regions of multiple objects come in contact with the touch screen. In some examples, step 256 can include image filtering and/or smoothing.

In step 258, the microcontroller can determine the coordinates for each of the calculated touch regions using a centroid calculation with the raw data associated with each touch region. The centroid can include the central coordinate of the touch region. In some examples, the microcontroller can compute features associated with each touch region, such as second and higher moments, area, density, major and minor axes and orientation for a best fit ellipse, wavelet and other types of region shape and density features. In step 260, the microcontroller (located in the sensing circuit 240) can send the processed information to the processor 210. The processor 210 can then perform tap and event gesture parsing in step 262. Based on the results from the tap and event gesture parsing, processor 210 can determine if the touch matches the unlock sequence or gesture.

While the process exemplified in FIG. 2B can be used to detect a sequence and/or one or more gestures for unlocking a device, the calculations performed in steps 256 and 258 can consume a significant amount of processing power. Additionally, transmitting the calculated touch information from the microcontroller to the processor 210 can consume additional power and can require the processor to wake (thereby requiring more power) before determining whether or not to unlock the device. A detection mechanism that is simpler, faster, and consumes less power can be desired.

Figure 3:
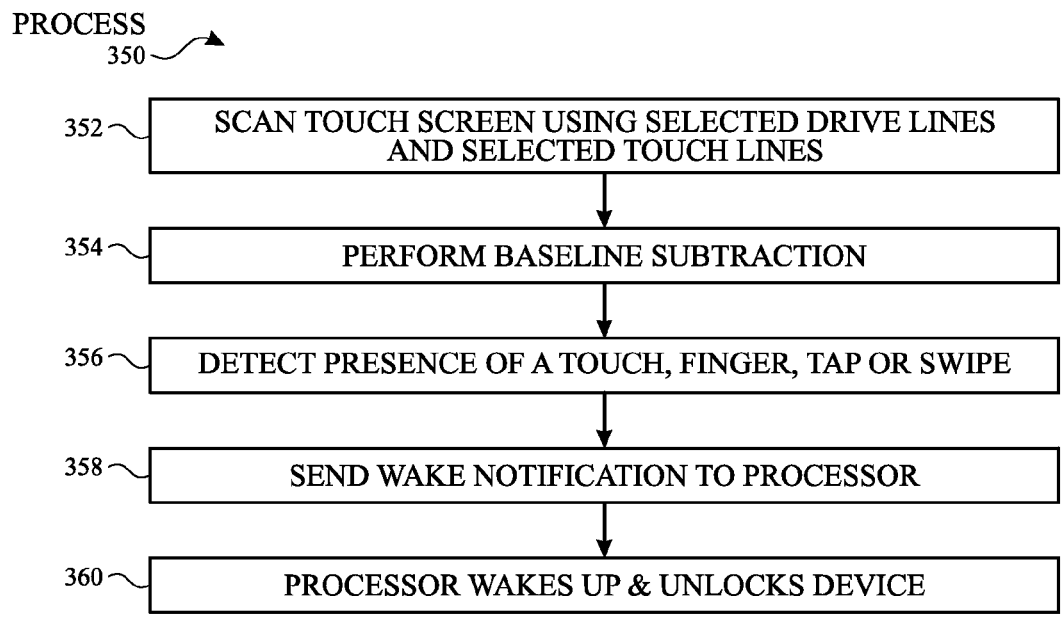
FIG. 3 illustrates an exemplary process for unlocking a device according to examples of the disclosure.

FIG. 3 illustrates an exemplary process for unlocking a device according to examples of the disclosure. Process 350 can include scanning the touch screen using selected drive lines and selected touch lines or sensing electrodes (step 352). To conserve power, one or more drive lines and/or one or more sense lines can be activated, while the other drive and sense lines can be powered down. In some examples, multiple drive lines and/or multiple sense lines can be switched to the same circuitry to reduce power consumption.

In some examples, drive and sense lines can be activated in some areas of the screen and deactivated in other areas. For example, drive and sense lines whose intersection occurs in the center of the screen can be activated, while other drive and sense lines can be deactivated. In some examples, all of the drive and sense lines can be activated, and the low power scan can include a full scan of the touch screen.

In step 354, a baseline subtraction can be performed by the microcontroller. In step 356, the microcontroller can detect the presence of a touch, finger, tap, or swipe using any one of the examples described below. In some examples, step 356 can be performed by a separate hardware component. In some examples, step 356 can be performed in firmware. In step 358, the microcontroller can send a notification or a wake signal to the processor 210. The notification can wake the processor 210, and the processor 210 can unlock the device and/or power on one or more components in step 360. By determining whether to unlock the device and/or switch the device from an idle state to an active state before powering on or waking up the processor, the amount of power consumed can be reduced, and the battery life can be extended. In some examples, the processor can consume a greater amount of power in the active state than the controller consumes in the active state.

Figures 4A, 4B, 4C:
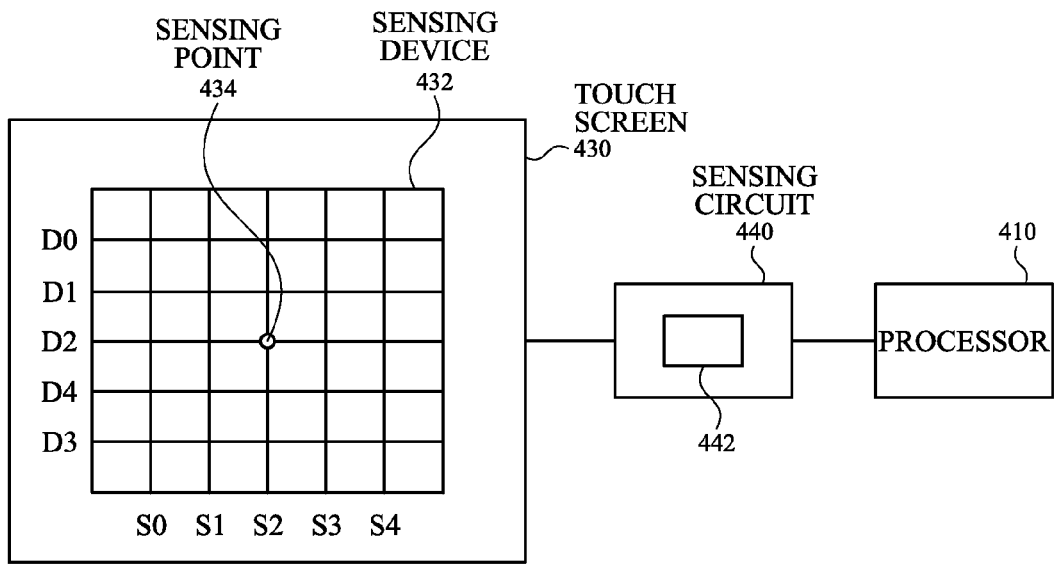
FIG. 4A illustrates an exemplary block diagram of a touch screen, sensing circuit, and processor for unlocking a device by detecting a presence of a touch using a low power scan according to examples of the disclosure.
FIGS. 4B-4C illustrate exemplary values for unlocking a device by detecting a presence of a touch using a low power scan according to examples of the disclosure.
Figure 4D:
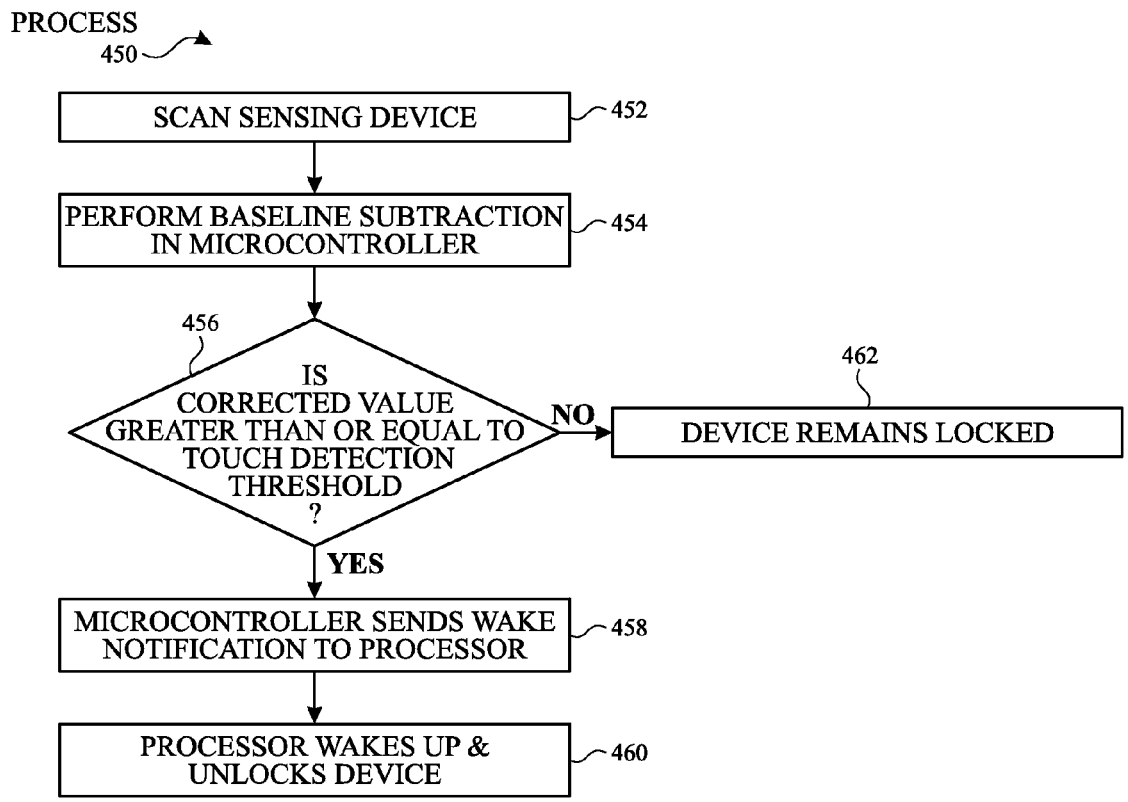
FIG. 4D illustrates an exemplary process for unlocking a device by detecting a presence of a touch using a low power scan according to examples of the disclosure.

FIGS. 4A-4D illustrate an exemplary block diagram, exemplary values, and an exemplary process for unlocking a device by detecting a presence of a touch using a low power scan according to examples of the disclosure. Process 450 can include scanning the sensing device 432 of touch screen 430 in step 452. As illustrated in FIG. 4A, sensing device 432 can include a plurality of sensing electrodes such as sensing point 434. Touch screen 430 can be operatively coupled to a sensing circuit 440. Sensing circuit 440 can include a microcontroller 442 and can be operatively coupled to a processor 410. In some examples, the scan can be limited to a certain area. For example, scanning the sensing device 432 can be limited to activating only those sensing points 434 located in the center of the sensing device 432. Although sensing device 432 is illustrated in FIG. 4A as a mutual capacitive touch sensing device, examples of the disclosure can include a self-capacitive touch sensing device.

Values at the sensing points 434 can be determined. As shown in FIG. 4B, a user touching the surface of touch screen 430 can be sensed by sensing point 434 located at the intersection of drive line D2 and sense line S2 and can generate a value of 25, for example. In step 454, the microcontroller 442 can perform a baseline subtraction (or division) on the generated value using a predetermined baseline value. For example, the predetermined baseline value can be 5, resulting in a corrected value of 20, as shown in FIG. 4C. In some examples, the predetermined baseline value can be indicative of a noise level in the absence of a touch. In step 456, the corrected value can be compared to a touch detection threshold. If the corrected value is greater than or equal to the touch detection threshold, microcontroller 442 can send a wake notification to processor 410 in step 458. In step 460, processor 410 can wake up in response to the received notification and can unlock the device. Otherwise, the device can remain locked (step 462).

Figure 5A:
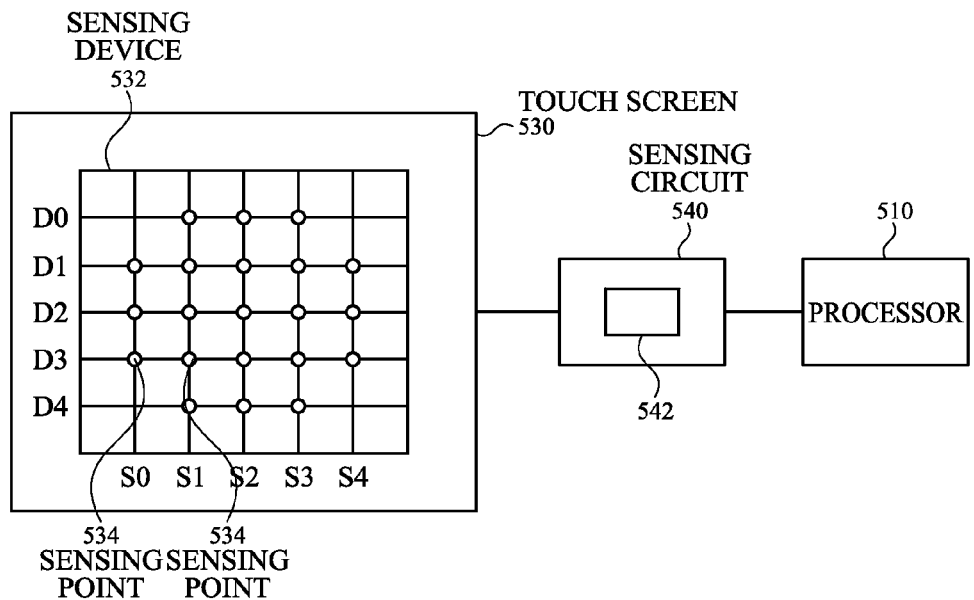
FIG. 5A illustrates an exemplary block diagram of a touch screen, sensing circuit, and processor for unlocking a device by rejecting a presence of an object covering the device surface using a low power scan according to examples of the disclosure.
Figure 5E:
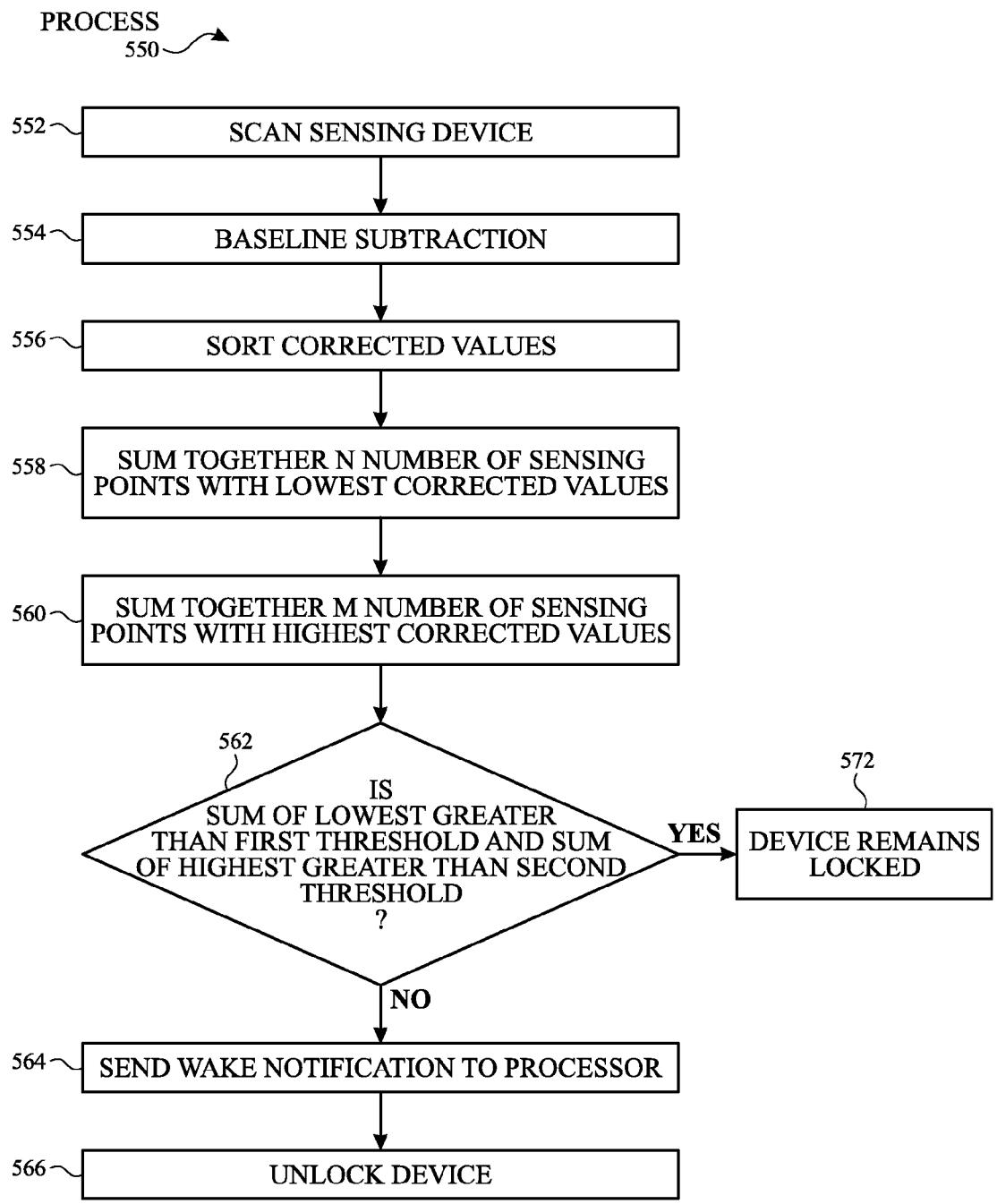
FIG. 5E illustrates an exemplary process for unlocking a device by rejecting a presence of an object covering the device surface using a low power scan according to examples of the disclosure.

To conserve power and extend battery life, the device should not wake when sensing a large body contact, such as being covered by a palm, crossed arms, the device placed in a pocket, etc. FIGS. 5A-5E illustrate an exemplary block diagram, exemplary values, and an exemplary process for preventing the unlocking of a device by rejecting the presence of an object covering the device surface using a low power scan according to examples of the disclosure. As illustrated in FIG. 5E, process 550 can include scanning the sensing device 532 of touch screen 530 in step 552. As illustrated in FIG. 5A, sensing device 532 can include a sensing points 534. Touch screen 530 can be operatively coupled to sensing circuit 540, and sensing circuit 540 can include a microcontroller 542. Sensing circuit can be operatively coupled to a processor 510. Although sensing device 532 is illustrated in FIG. 5A as a mutual capacitive touch sensing device, examples of the disclosure can include a self-capacitive touch sensing device.

An object (e.g., a large body contact) can be covering the surface of the touch screen 530 (i.e., a cover touch), and can lead to a plurality of sensing points 534 detecting the presence of the object. As shown in FIGS. 5A-5B, the presence of the object covering the surface of the touch screen 530 can cause a change in capacitance (as described earlier). The change in capacitance can be sensed at those sensing points 534. In step 554, microcontroller 542 can perform a baseline subtraction (or division) on the touch values using a predetermined baseline value or noise threshold. For example, the predetermined baseline value can be 5, and performing a baseline subtraction can lead to the corrected values shown in FIG. 5C. In step 556, the corrected values can be sorted in ascending (or descending) order, as shown in FIG. 5D.

In step 558, microcontroller 542 can sum together a certain number (e.g., N number) of sensing electrodes with the lowest corrected values (compared to all or a subset of all of the corrected values). In step 560, microcontroller 542 can sum together a certain number (e.g., M number) of sensing electrodes with the highest corrected values (compared to all or a subset of all of the corrected values). For example, N can be 6, and M can be 4. The sum of the N sensing electrodes with the lowest corrected values (i.e., sum of the lowest) can be 150, and the sum of the M sensing electrodes with the highest corrected values (i.e., sum of the highest) can be 300. In step 562, microcontroller 542 can compare the sum of the lowest to a first threshold value and can compare the sum of the highest to a second threshold value. If sum of the lowest is greater than the first threshold value (i.e., the touch is not a finger touch or touch from a small object) and sum of the highest is greater than the second threshold value (i.e., the touch is a hovering object), then the touch detected is a large body contact or a cover touch. As a result, the device can remain locked in step 572. If the touch detected is not a large body contact or a cover touch, the microcontroller 542 can send a wake notification to processor 510 (step 564), and processor 510 can unlock the device (step 566). In some examples, the microcontroller 542 can check for other conditions before sending the wake notification to processor 510.

Figure 6A:
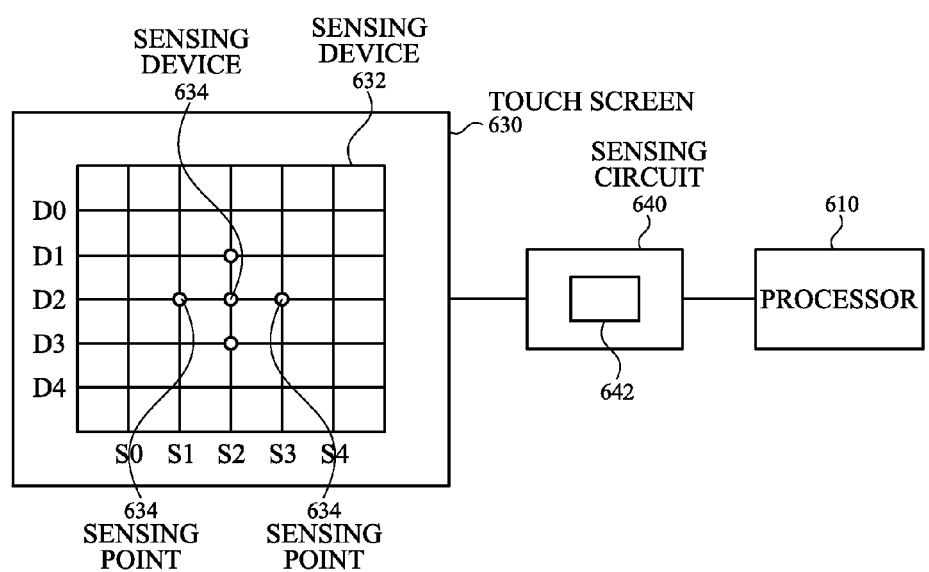
FIG. 6A illustrates an exemplary block diagram of a touch screen, sensing circuit, and processor for unlocking a device by detecting a presence of a finger using a low power scan according to examples of the disclosure.

FIGS. 6A-6E illustrate an exemplary block diagram, exemplary values, and an exemplary process for unlocking a device by detecting a presence of a finger using a low power scan according to examples of the disclosure. FIG. 6A illustrates a touch screen 630 including sensing device 632 and coupled to a sensing circuit 640. Sensing circuit 640 can include a microcontroller 642 and can be coupled to a processor 610. Sensing device 632 can include a plurality of sensing points 634.

Figures 6D, 6E:
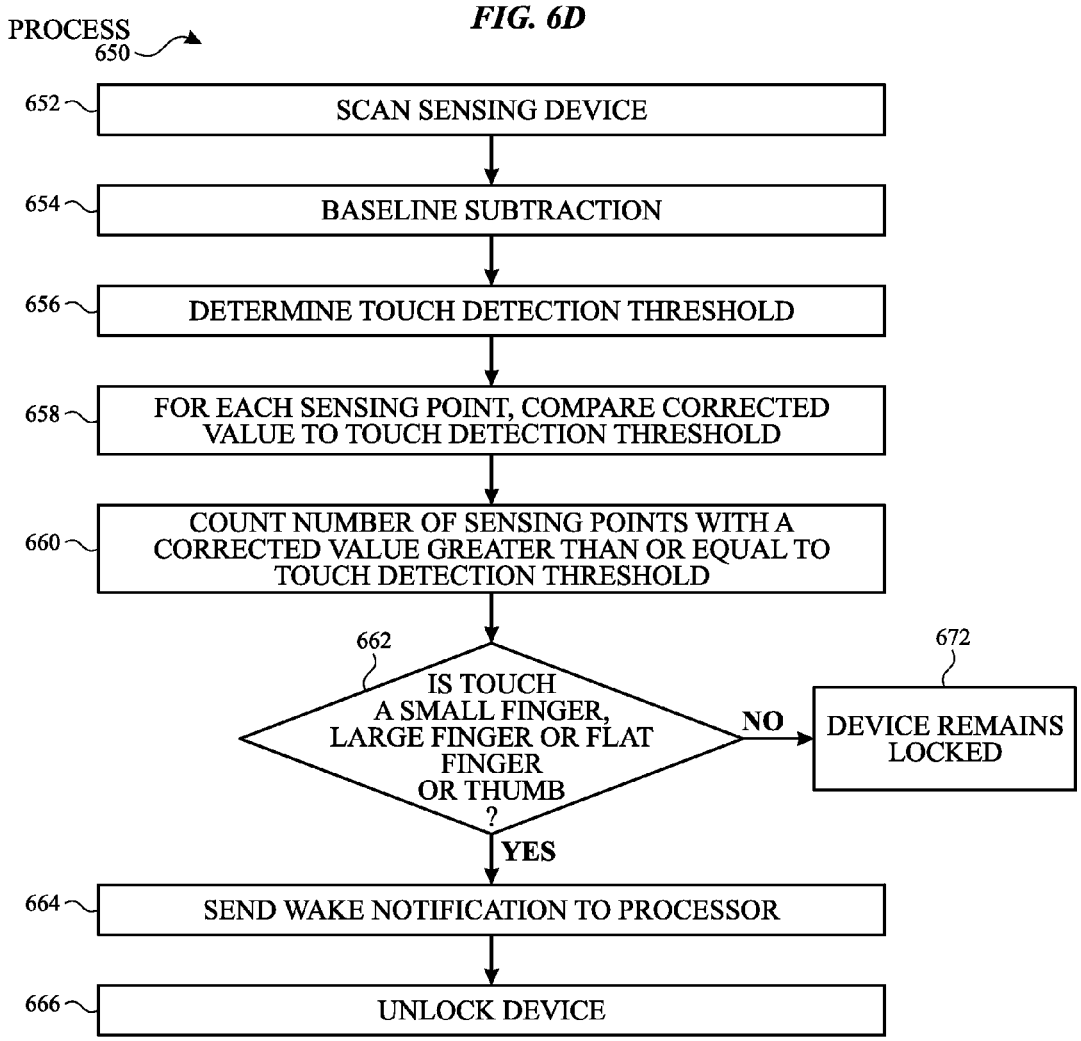

As shown in FIG. 6E, process 650 can include scanning the scanning device 632 of touch screen 630 in step 652. A finger can be present at the surface of the touch screen 630 leading to a change in touch values at the corresponding sensing points 634 (e.g., sensing points at (D1,S2), (D2,S1), (D2,S2), (D2,S3), and (D3,S2) intersections) as shown in FIG. 6B. In step 654, microcontroller 642 can perform a baseline subtraction on the values using a predetermined baseline value. For example, a predetermined baseline value of 5 can be subtracted from the values resulting in the corrected values shown in FIG. 6C.

The microcontroller 642 can determine if the touch is a finger (or another object) by looking at the area of the touch image. In step 656, microcontroller 642 can determine a touch detection threshold. The touch detection threshold can be, for example, a value calculated from a certain percentage of full coverage (e.g., the value when the touch screen surface is fully covered). In some examples, full coverage can have a value of 1024, and the touch detection threshold can be equal to 20% full coverage or 204. In some examples, the touch detection threshold can be predetermined. For example, the touch detection threshold can have a predetermined value of 50. In step 658, for each sensing electrode, microcontroller 642 can compare the corrected value to the touch detection threshold. Microcontroller 642 can discard any corrected values that are less than the touch detection threshold, as shown in FIG. 6D. The microcontroller 642 can count the number of sensing electrodes with a corrected value greater than or equal to the touch detection threshold (i.e., number of peak pixels) in step 660. For example, the number of peak pixels can be 5. In step 662, microcontroller 642 can determine if the finger is a small finger (e.g., number of peak pixels is between 1 and 5), large finger (e.g., number of peak pixels is between 5 and 10) or a flat finger or thumb (e.g., number of peak pixels is greater than 10, but not a large body contact). If the number of peak pixels corresponds to a small finger, large finger, or flat finger or thumb, then microcontroller 642 can send a wake notification to processor 610 (step 664). In step 666, processor 610 can unlock the device. If the number of peak pixels does not correspond to a small finger, large finger, or flat finger or thumb, then the device can remain locked in step 672.

Figure 6F:
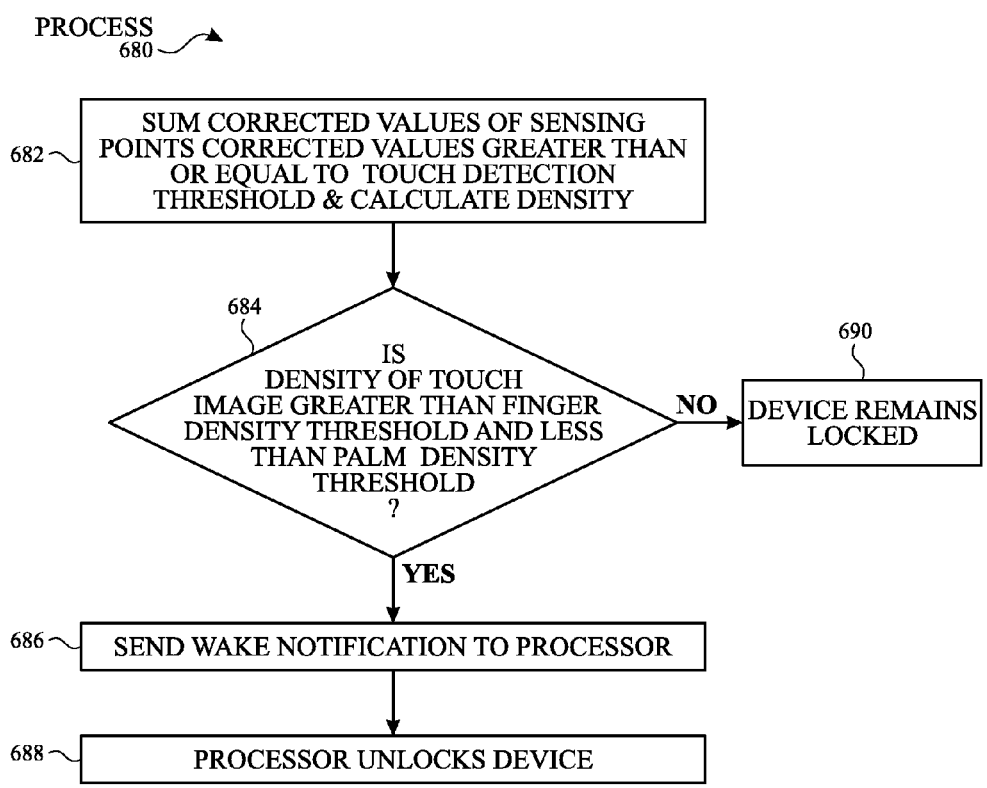
FIG. 6F illustrates an exemplary process for detecting a presence of a finger based on area and density using a low power scan according to examples of the disclosure.

In some examples, both an area and density can be used as an indication of a presence of a finger. FIG. 6F illustrates an exemplary process for detecting a presence of a finger based on area and density according to examples of the disclosure. Similar to process 650 in FIG. 6E, process 680 for detecting a presence of a finger based on area and density can include steps 652-662 for comparing the area of the touch image to an area of a finger. Process 680 can also include summing the corrected values of those sensing electrodes 634 that have a corrected value greater than or equal to a touch detection threshold and calculating a density in step 682. For example, the sum of the corrected values of the sensing electrodes can be 375 and the density can be 75. In step 684, microcontroller 642 can compare the density to a finger density threshold and a palm density threshold. If the density of the touch image is greater than the finger density threshold, but less than the palm density threshold, then the microcontroller 642 can send a wake notification to processor 610 (step 686), and processor 610 can unlock the device (step 688). If the density of the touch image is less than the finger density threshold or the density of the touch image is greater than the palm density threshold, the device can remain locked (step 690). The finger density threshold can be a value representative of a finger touch, and palm density threshold can be a value representative of a palm touch.

Figure 7:
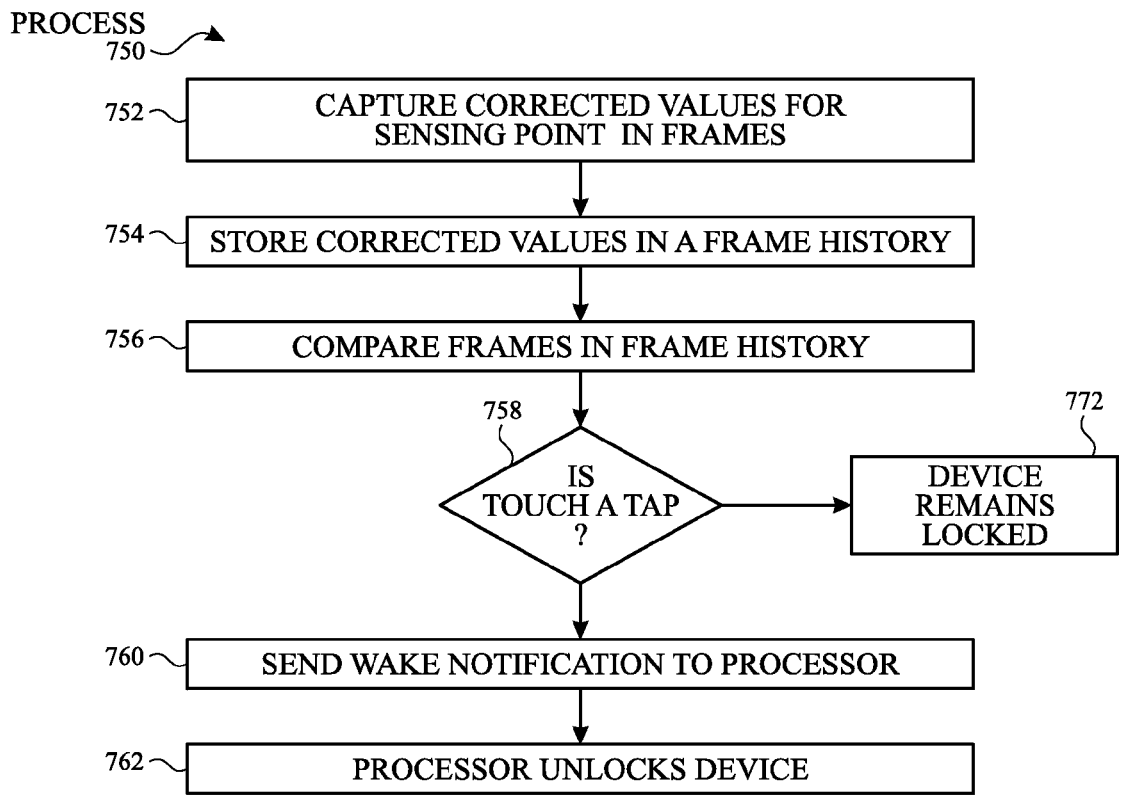
FIG. 7 illustrates an exemplary process for unlocking a device by detecting a presence of a tap using a low power scan according to examples of the disclosure.

FIG. 7 illustrates an exemplary process for unlocking a device by detecting a presence of a tap using a low power scan according to examples of the disclosure. Detecting a presence of a tap can include the microcontroller rejecting any touches that are large body contacts (as illustrated in FIGS. 5A-5E, for example) and determining if the touch is a finger touch (as illustrated in FIGS. 6A-6F, for example). Process 750 for detecting a tap can further include capturing corrected values for the plurality of sensing electrodes in frames (step 752), and storing the result of each frame in a local memory or frame history (step 754). In step 756, the microcontroller can compare the results from a frame history. Based on the results from the frame history, the microcontroller can determine if the touch is a tap (step 758). In some examples, determining the touch is a tap can include a finger touch detected in one frame and no finger touch detected in a following frame. In some examples, the touch can be rejected as a tap if the duration of the touch exceeds a predetermined number of frames or a predetermined duration. In some examples, the touch can be rejected as a tap if its centroid position is not substantially near a center of the touch screen as determined by exceeding a predetermined distance threshold. The microcontroller can send a wake notification to the processor (step 760), and the processor can unlock the device (step 762) if the touch is a tap. If the touch is not a tap, the device can remain locked (step 772).

Although FIG. 7 illustrates an exemplary process for unlocking a device by detecting a presence of a tap, examples of the disclosure can include detecting a presence of a double tap, detecting a presence of a finger hold, and detecting a presence of a tap followed by a finger hold. Detecting a presence of a double tap or a presence of a finger hold can include comparing the results from the frame history (step 756).

Determining if the touch is a double tap can include at least four frames. The four frames can include a finger touch detected in one frame and no finger touch detected in a following frame, followed by a finger touch detected a second time and no finger touch detected a second time.

Determining the touch is a finger hold can include multiple frames where the finger touch is detected. In some examples, the number of frames can be higher and/or can be based on a sampling rate. In some examples, determining a presence of a tap can include determining whether the touch is located within a certain region.

In some examples, the finger touch detected can be in substantially the same location. In some examples, the finger touch detected can have substantially the same area. In some examples, the frames can be consecutive.

Detecting a presence of a tap followed by a finger hold can include at least four frames. The four frames can include a finger touch detected in one frame, no finger touch detected in a following frame, followed by a finger touch detected a second time for multiple frames.

Figure 8A:
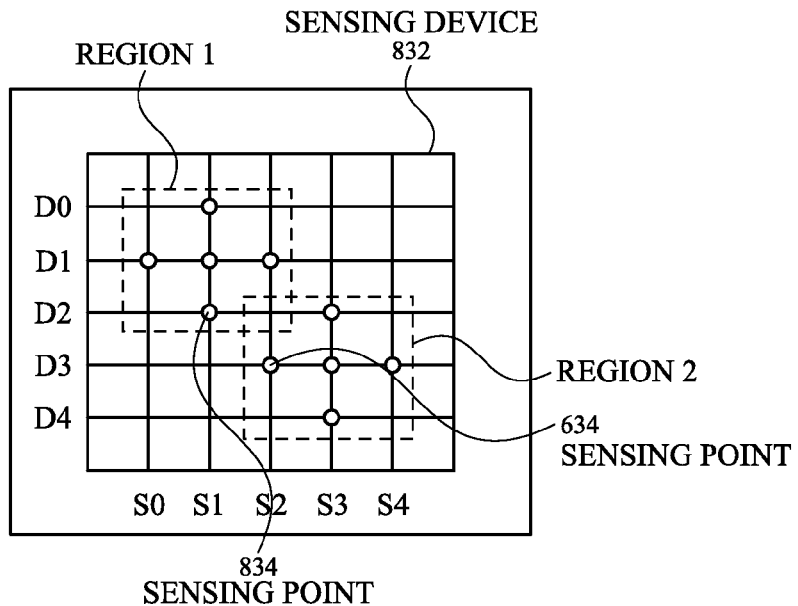
FIG. 8A illustrates an exemplary block diagram of a touch screen, sensing circuit, and processor for unlocking a device by detecting a presence of a two or multiple fingers tap according to examples of the disclosure.
Figure 8B:
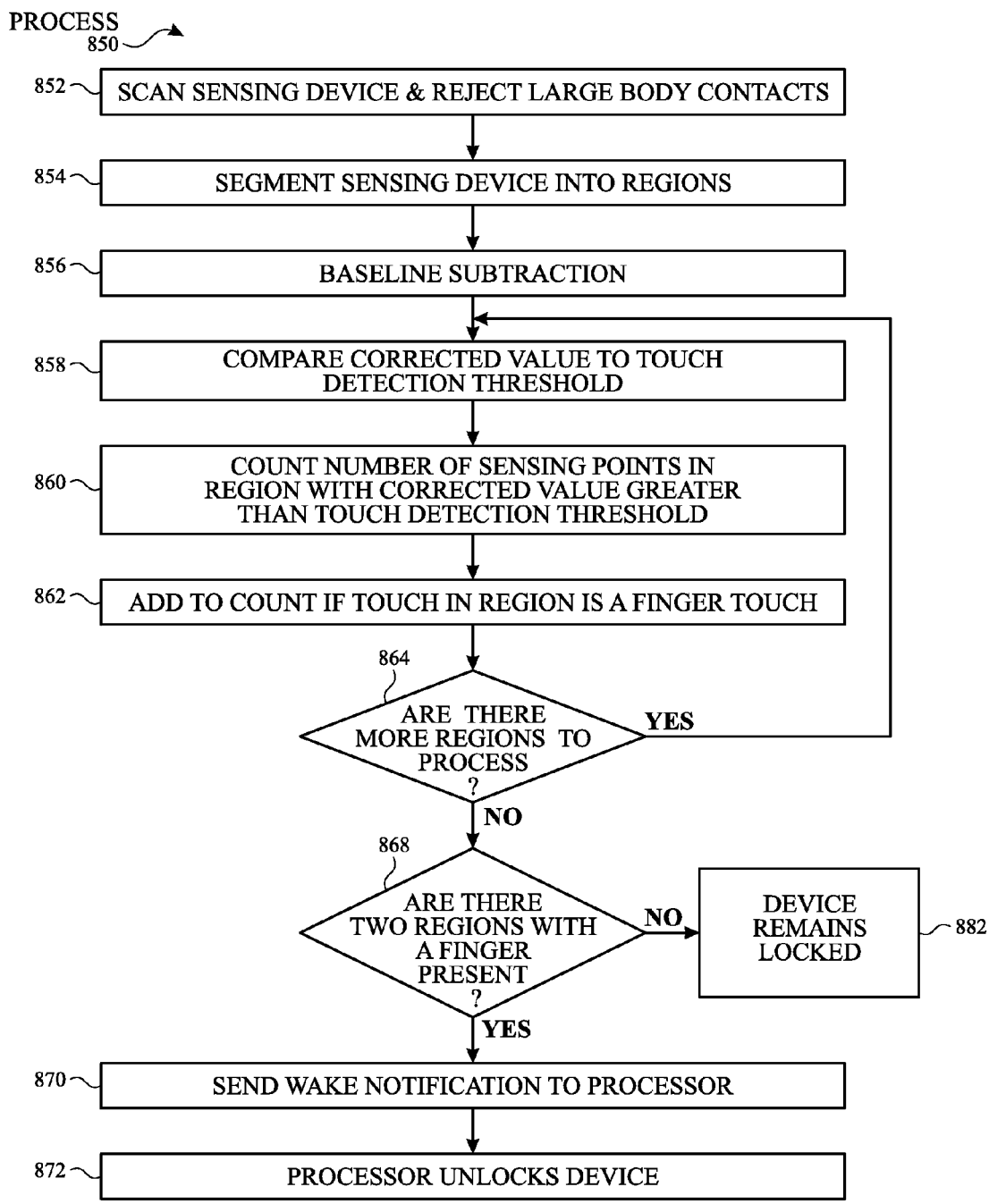
FIG. 8B illustrates an exemplary process for unlocking a device by detecting a presence of a two or multiple fingers tap according to examples of the disclosure.

FIGS. 8A-8B illustrate an exemplary block diagram and an exemplary process for unlocking a device by detecting a presence of a two or multiple fingers tap according to examples of the disclosure. Detecting a presence of a two fingers tap can include the microcontroller scanning the sensing device 832 and rejecting any touches that are large body contacts or cover touches in step 852 of process 850. Sensing device 832 can be segmented into regions such as region 1 and region 2 (step 854). Sensing device 832 can determine for each region if a touch in that region is a finger.

Determining if a touch in a region is a finger can include, for each sensing point 834, a baseline subtraction (step 856) to result in a plurality of corrected values, comparing each corrected value to a touch detection threshold (step 858), counting the number of sensing electrodes 834 in a region (e.g., region 1 or region 2) with a corrected value greater than the touch detection threshold (step 860), and determining if a touch in the region is a finger touch (step 862). The process can be repeated for each region (step 864). In step 868, the microcontroller can determine if the number of regions with a finger tap is equal to two. If a two fingers tap is present, the microcontroller can send a wake notification to the processor (step 870), and the processor can unlock the device (step 872). Otherwise, the device can remain locked (step 882).

Figure 8C:
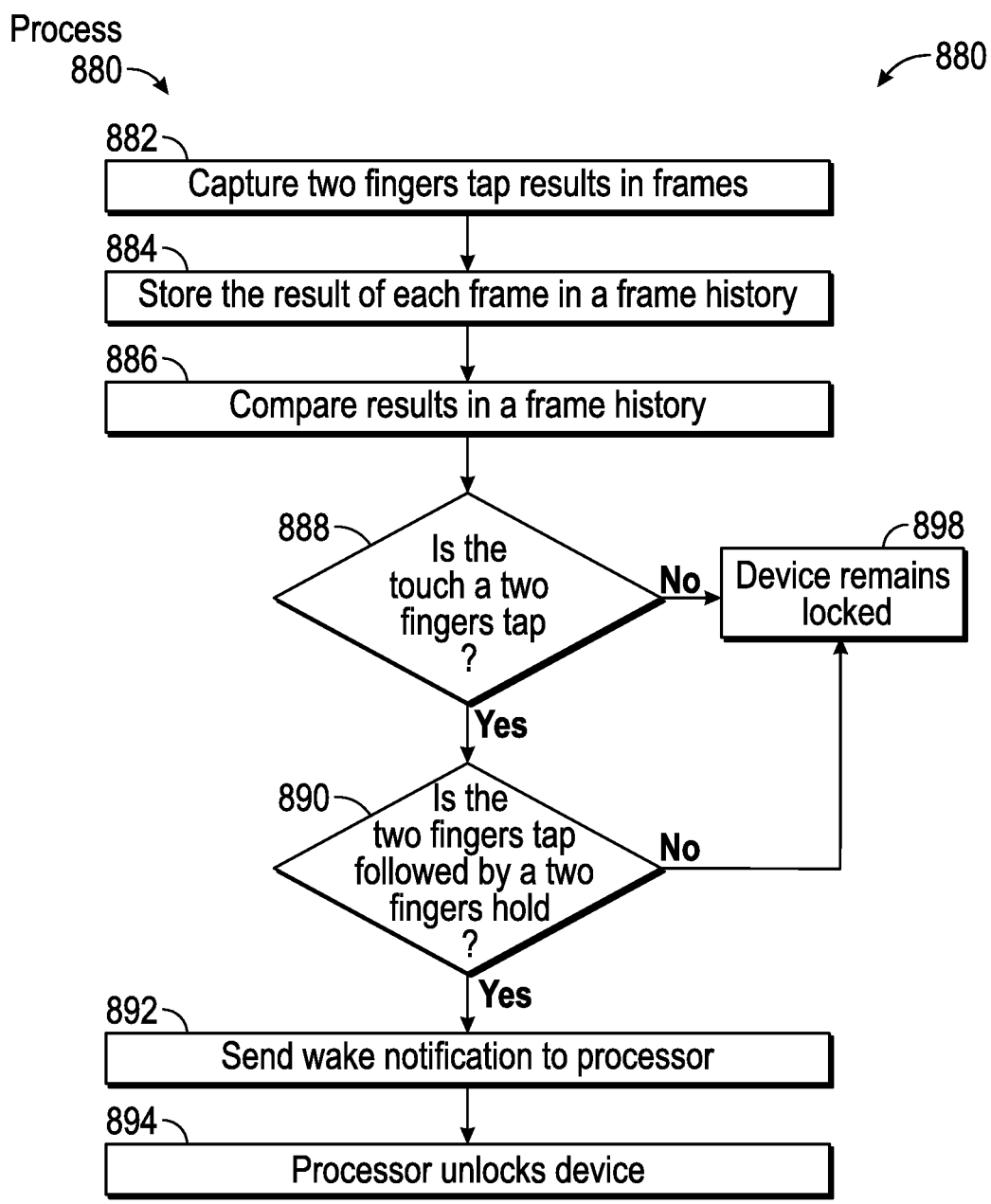
FIG. 8C illustrates an exemplary process for unlocking a device by detecting a presence of a two fingers tap and hold using a lower power scan according to examples of the disclosure.

FIG. 8C illustrates an exemplary process for unlocking a device by detecting a presence of a two fingers tap and hold using a lower power scan according to examples of the disclosure. Process 880 can include capturing two fingers tap results in frames in step 882, and storing the result of each frame in a frame history in step 884. In step 886, the microcontroller can compare the results from the frame history. Based on the results from the frame history, the microcontroller can determine if the touch is a two fingers tap (step 888). In some examples, determining if the touch is a two fingers tap can include a two fingers touch detected in one frame and no finger (or less than or greater than two fingers) touch detected in a following frame. In step 890, microcontroller can determine if a two fingers hold is detected following detection of a two fingers tap. Detection of a two fingers hold can include multiple frames where a touch using two fingers is detected. If a two fingers tap or two fingers hold is not detected, the device can remain locked (step 898). Otherwise, the microcontroller can send a wake notification to the device (step 892), and the processor can unlock the device (step 894).

Figure 9:
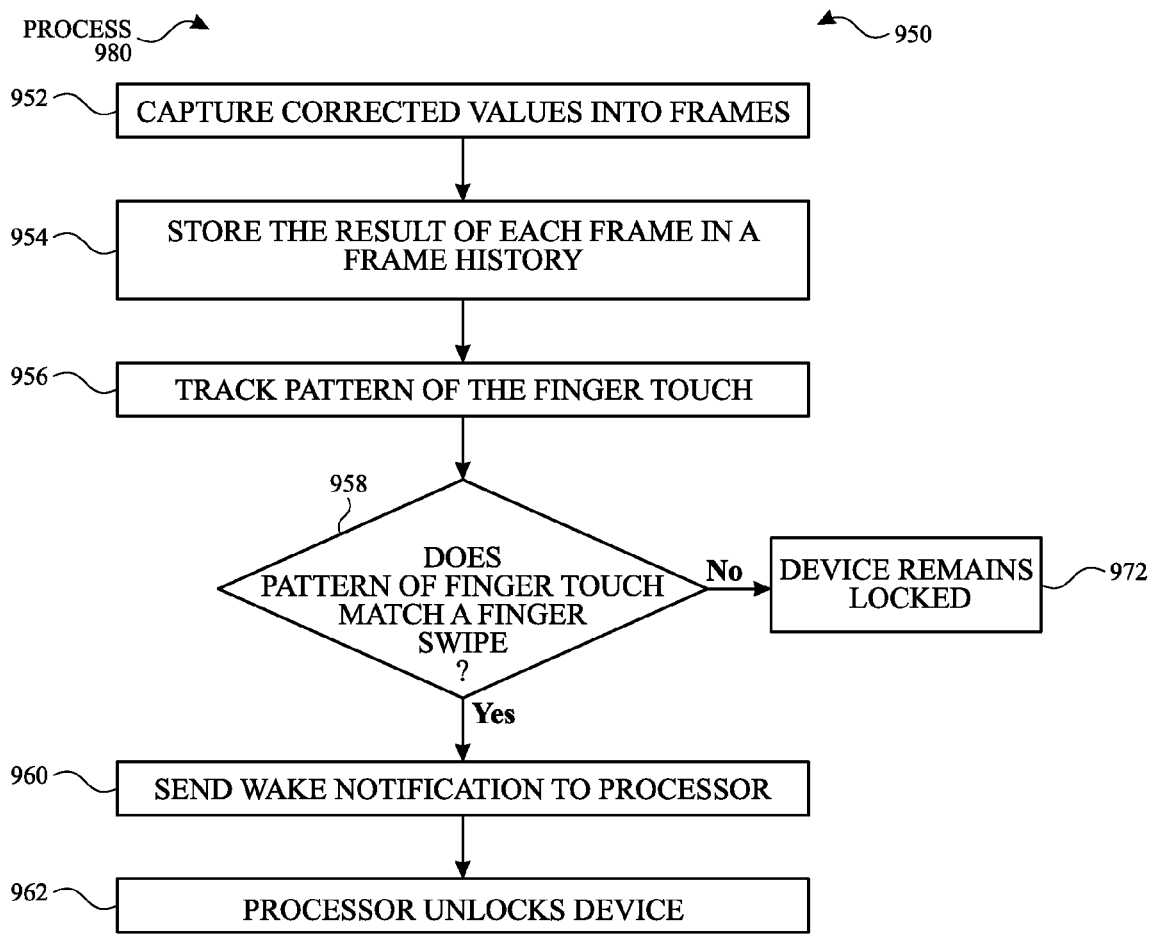
FIG. 9 illustrates an exemplary process for unlocking a device by detecting a presence of a finger swipe according to examples of the disclosure.

FIG. 9 illustrates an exemplary process for unlocking a device by detecting a presence of a finger swipe according to examples of the disclosure. Process 950 can include the microcontroller rejecting any touches that are large body contacts or cover touches (as illustrated in FIGS. 5A-5E, for example), and determining if the touch is a finger touch (as illustrated in FIGS. 6A-6F, for example). In step 952, corrected values for the plurality of sensing electrodes can be captured into frames. In step 954, the result of each frame can be stored in a frame history. In step 956, the microcontroller can track the pattern of the finger touch. If the pattern of the finger touch over the course of several frames is similar or closely matches a finger swipe, the microcontroller can determine that a finger swipe is present (step 958). In some examples, determination of a finger swipe can include determining whether a line path is followed over a predetermined number of frames, determining whether a predetermined speed threshold has been exceeded, and/or determining whether the pattern of finger touch is located within a certain region or follows a certain direction. In some examples, an active region centroid location can be determined. In some examples, an active region size metric and/or active region orientation metric can be used. In some examples, frame-to-frame region correlation metric and/or frame-to-frame region velocity region can be used. In some examples, the microcontroller can limit the detection of the finger swipe to one or more designated regions on the touch screen surface. If a finger swipe is present, the microcontroller can send a wake notification to the processor (step 960), and the processor can unlock the device (step 962). If a finger swipe is not present and/or if the location of the finger swipe is not in the designated areas, the device can remain locked (step 972).

In some examples, the one or more examples described above can be sampled at a lower rate than compared to an active touch mode scan rate. In some examples, to prevent false detection, the touch, finger, tap, and/or swipe detection can be limited to a center of the touch screen. The portable electronic device can include a housing surrounding the touch screen. The housing can be made of a conductive material that can surround a peripheral area of the touch screen. Touches detected in the peripheral area of the touch screen may be from the coupled housing, and as a result, may be a false detection.

Figure 10A:
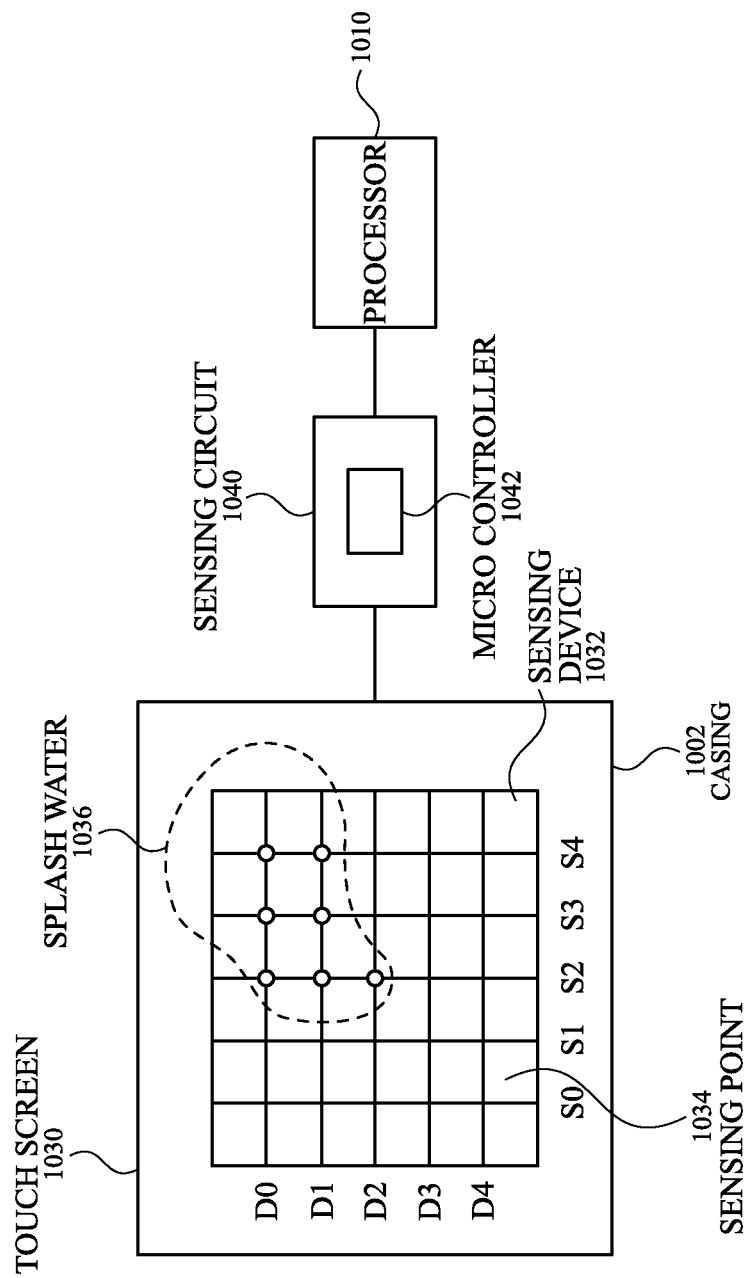
FIG. 10A illustrates an exemplary block diagram of a touch screen, sensing circuit, and processor with a water splash located on the touch screen generating a false wake up according to examples of the disclosure.

In some examples, the device can waste power due to false wake ups. The false wake ups can be caused by water droplets, water splashes, a water film, or noise, for example. A device that can distinguish a normal touch from a touch caused by artifacts can help eliminate or reduce the false wake ups. FIG. 10A illustrates an exemplary block diagram of a touch screen, sensing circuit, and processor with a water splash located on the touch screen generating a false wake up according to examples of the disclosure. Sensing device 1032 can include a plurality of sensing points 1034. Touch screen 1030 can include sensing device 1032 housed in casing 1002 and can be operatively coupled to sensing circuit 1040. Sensing circuit 1040 can include a microcontroller 1042 and can be operatively coupled to a processor 1010. Water splash 1036 can be touching the surface of touch screen 1030, and can lead to a plurality of sensing points 1034 detecting the presence of the water splash 1036 as a touch. The change in capacitance due to the water splash 1036 touching the surface of touch screen 1030 and the casing 1002 can lead to non-zero touch values detected at the corresponding sensing points 1034. The microcontroller 1042 can perform touch detection using any one of the exemplary processes illustrated above, but can also generate a false wake up. That is, the water splash 1036 can cause the microcontroller 1042 to mistakenly believe that the non-zero touch values represent a real touch (i.e., a touch from the user's finger) indicative of the user's desire to wake up the device, and microcontroller 1042 can generate a false wake up in response to the detected touch. The microcontroller 1042 may have to perform additional computing in order to prevent false wake ups.

FIG. 10B illustrates exemplary values for a water splash located on a touch screen according to examples of the disclosure. The water splash 1036 on touch screen 1030 of FIG. 10A can be detected by the microcontroller 1042. Microcontroller 1042 can determine if the sensed touch is a cover touch, and cover touches can be rejected. Determination and rejection of a cover touch can include one or more of the examples described earlier. The sorted, corrected values for each of the sensing points 1034 are shown in FIG. 10B.

Figure 10C:
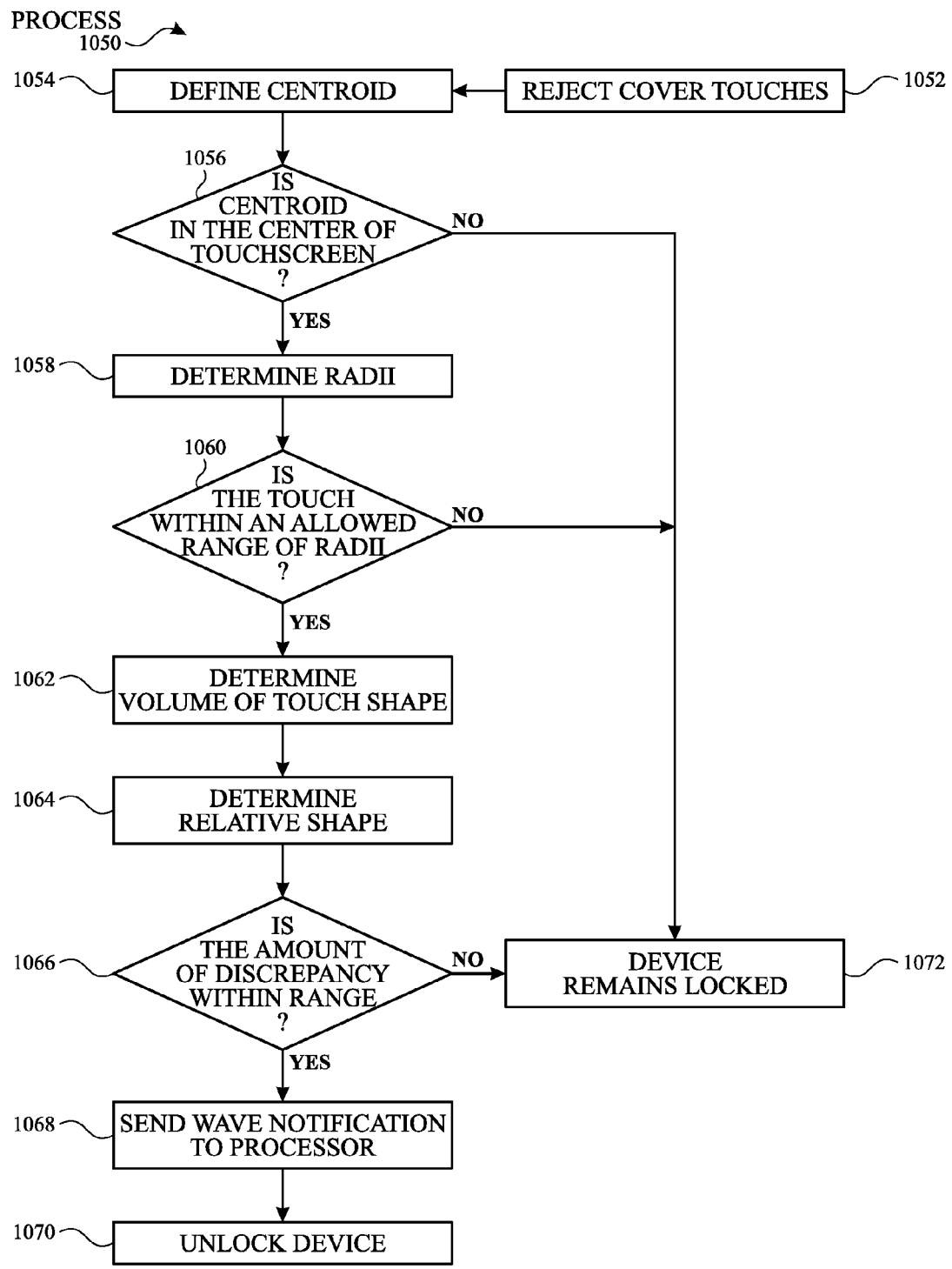
FIG. 10C illustrates an exemplary process for rejecting water splashes according to examples of the disclosure.

FIG. 10C illustrates an exemplary process flow for rejecting water splashes according to examples of the disclosure. In step 1052 of process 1050, cover touches can be rejected (as described above). In step 1054, microcontroller 1042 can define a centroid for the pixels whose corrected value is greater than a pre-determined threshold. The x-coordinate value for the centroid can be determined as:

$$C_x = \frac{\sum_{i=1}^{D} \sum_{j=1}^{S} x_i CV_{ij}}{\sum_{i=1}^{D} \sum_{j=1}^{S} CV_{ij}} \quad (1)$$

where $x_i$ is the x-coordinate value of the pixel location, $CV_{ij}$ is the corrected value at that location, D is the number of rows (or drive lines) and S is the number of columns (or sense lines).

The y-coordinate value for the centroid can be determined as:

$$C_y = \frac{\sum_{i=1}^{D} \sum_{j=1}^{S} y_i CV_{ij}}{\sum_{i=1}^{D} \sum_{j=1}^{S} CV_{ij}} \quad (2)$$

where $y_i$ is the y-coordinate value of the pixel location.

Figure 10D:
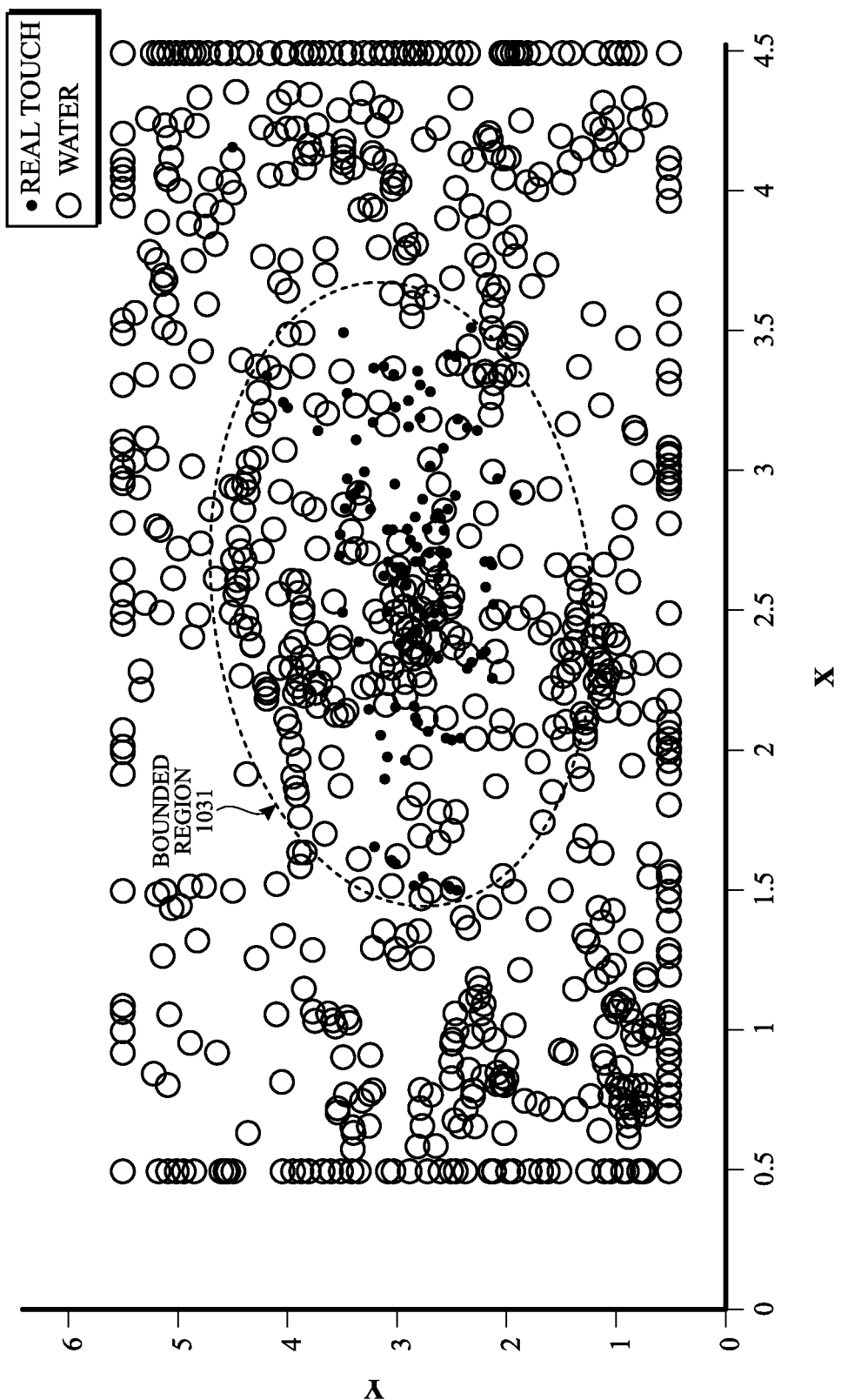
FIG. 10D illustrates an exemplary scatter plot of centroid positions for real touches and water splashes according to examples of the disclosure.

FIG. 10D illustrates an exemplary scatter plot of centroid positions for real touches and water splashes according to examples of the disclosure. The small, solid circles can represent the centroid position for multiple real touches, and the large, open circles can represent the centroid position for multiple water splashes. The figure is illustrative of how the centroid position can be confined to the middle area of the touch screen 1030 (i.e., the centroid position of a real touch can be located within Bounded Region 1031). The centroid position for water, on the other hand, may not be confined to the middle area and instead, can be located throughout the touch screen 1030, such as in peripheral areas of the touch screen (e.g., outer areas of the touch screen that are away from the center and close to the housing). Linear decision boundaries can be set for a touch to eliminate or reduce false positives for water splashes, a water film, or noise and false negatives for touch.

Referring again to FIG. 10C, in step 1056, microcontroller 1042 can reject the touches whose centroid position is not located in the center or substantially in the center position $CP_x$, $CP_y$. That is, $$\|C_x - CP_x\| < CD \quad (3)$$

$$\|C_y - CP_y\| < CD \quad (4)$$

where CD can be a pre-determined distance threshold representative of the distance from the center where touches are accepted. For example, CD can be 5 mm or the size of one pixel.

In step 1058, the standard deviation in the horizontal and vertical dimensions can be computed to determine the radii $R_x$ and $R_y$ of the water splash 1036 in the x and y directions.

$$R_x = SF \sqrt{\frac{\sum_{i=1}^{D} \sum_{j=1}^{S} (x_i - C_x)^2 CV_{ij}}{\sum_{i=1}^{D} \sum_{j=1}^{S} CV_{ij}}} \quad (3)$$

$$R_y = SF \sqrt{\frac{\sum_{i=1}^{D} \sum_{j=1}^{S} (y_i - C_y)^2 CV_{ij}}{\sum_{i=1}^{D} \sum_{j=1}^{S} CV_{ij}}} \quad (4)$$

where SF is a scale factor that can convert pixels to mm units. In some examples, the radii $R_x$ and $R_y$ can be calibrated using a 10 mm diameter standard probe or a size of a typical finger.

Figure 10E:
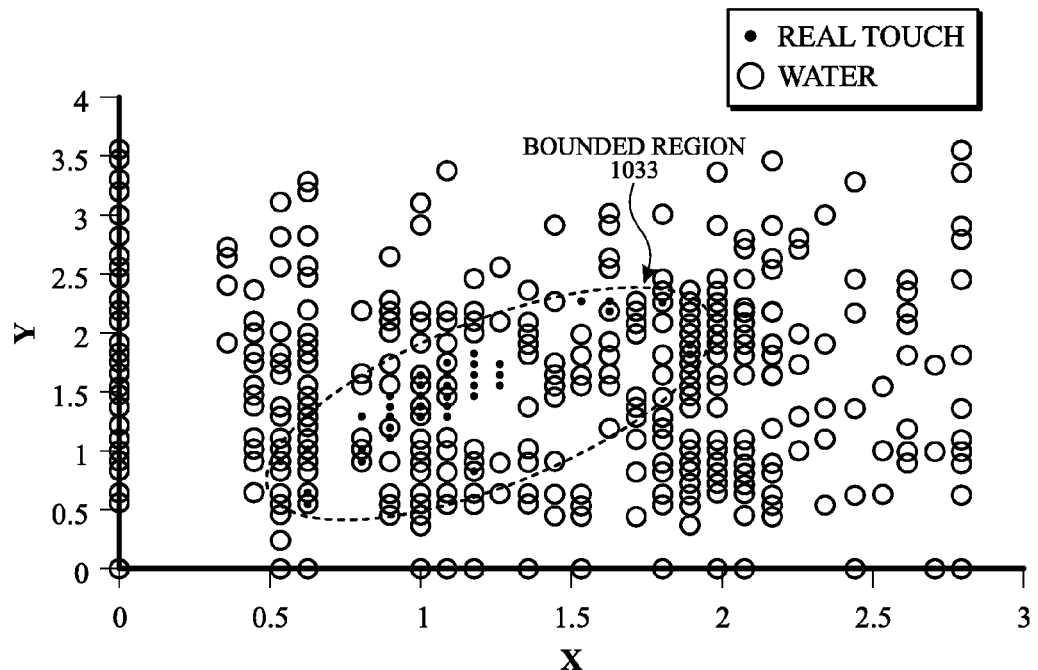
FIG. 10E illustrates an exemplary scatter plot of the radii of real touches and water splashes according to examples of the disclosure.

FIG. 10E illustrates an exemplary scatter plot of the radii along the x-direction and the y-direction for real touch touches and water splashes according to examples of the disclosure. As illustrated in the figure, the radii for real touches can be bounded between a certain range of radii values along the x-direction and along the y-direction (i.e., the combined radii along the x-direction and along the y-direction of a real touch can be located within Bounded Region 1033), whereas the radii for water splashes can be scattered throughout. Boundaries can be set to represent a user's finger touch or multiple finger touches. In some examples, the boundaries can be set during a calibration procedure. The boundaries can help eliminate or reduce false positives for water splashes and false negatives for touch.

In step 1060, microcontroller 1042 can determine if the touch is within an allowed range of radii.

$$LR < R_x < UR \quad (5)$$

$$LR < R_y < UR \quad (6)$$

where LR and UR can be indicative of lower and upper bounds of the radii. For example, UR can be 5 mm, and water splash 1036 can have a radius $R_x$ larger than 5 mm (or a diameter larger than 10 mm). As a result, the touch from water splash 1036 can be rejected.

Figure 10F:
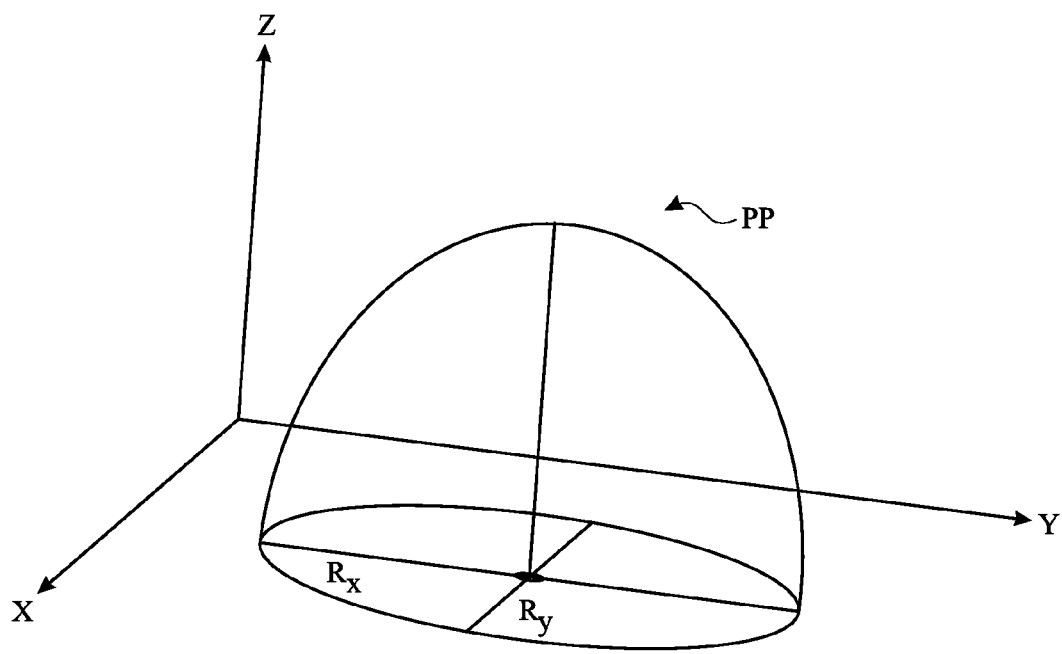
FIG. 10F illustrates a three-dimensional plot of corrected values and a shape for an exemplary finger touch image according to examples of the disclosure.
Figure 10G:
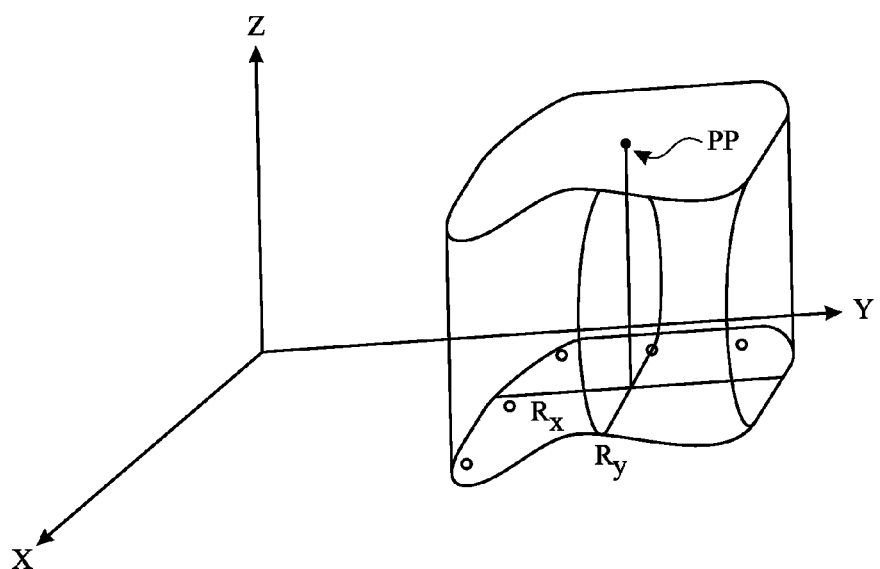
FIG. 10G illustrates a three-dimensional plot of corrected values and a shape of an exemplary water splash located on a touch screen according to examples of the disclosure.

In addition to centroid and radii, a finger touch can resemble a specific shape, such as an ellipsoid. FIG. 10F illustrates a three-dimensional plot of correct values and a shape for an exemplary finger touch image according to examples of the disclosure. PeakPixel (PP) can represent the largest corrected value of the finger touch. FIG. 10G illustrates a three-dimensional plot of corrected values and a shape of an exemplary water splash located on a touch screen according to examples of the disclosure. In step 1062, the volume of the touch shape can be determined. For example, the volume of an ellipsoid can be:

$$V_{ellipsoid} = \frac{4}{3} \pi R_x R_y PP \quad (7)$$

In step 1064, the volume of the touch can be compared to an ellipsoidal shape to determine a relative shape or an amount of discrepancy from a real touch. PeakPixelValue$_{ij}$ is defined to be equal to $CV_{ij}$ whenever $CV_{ij} > T$, or equal to zero otherwise. T can be a predetermined threshold. In some examples, T can be a fixed percentage of the sensor full scale.

$$LD < \frac{V_{ellipsoid}}{\sum_{i=1}^{D} \sum_{j=1}^{S} PeakPixelValue_{ij}} < UD \quad (8)$$

where DL can be a lower bounds and DH can be an upper bounds on the amount of discrepancy. The microcontroller 1042 can determine if the relative shape or amount of discrepancy is within an allowed range (step 1066).

Figure 10H:
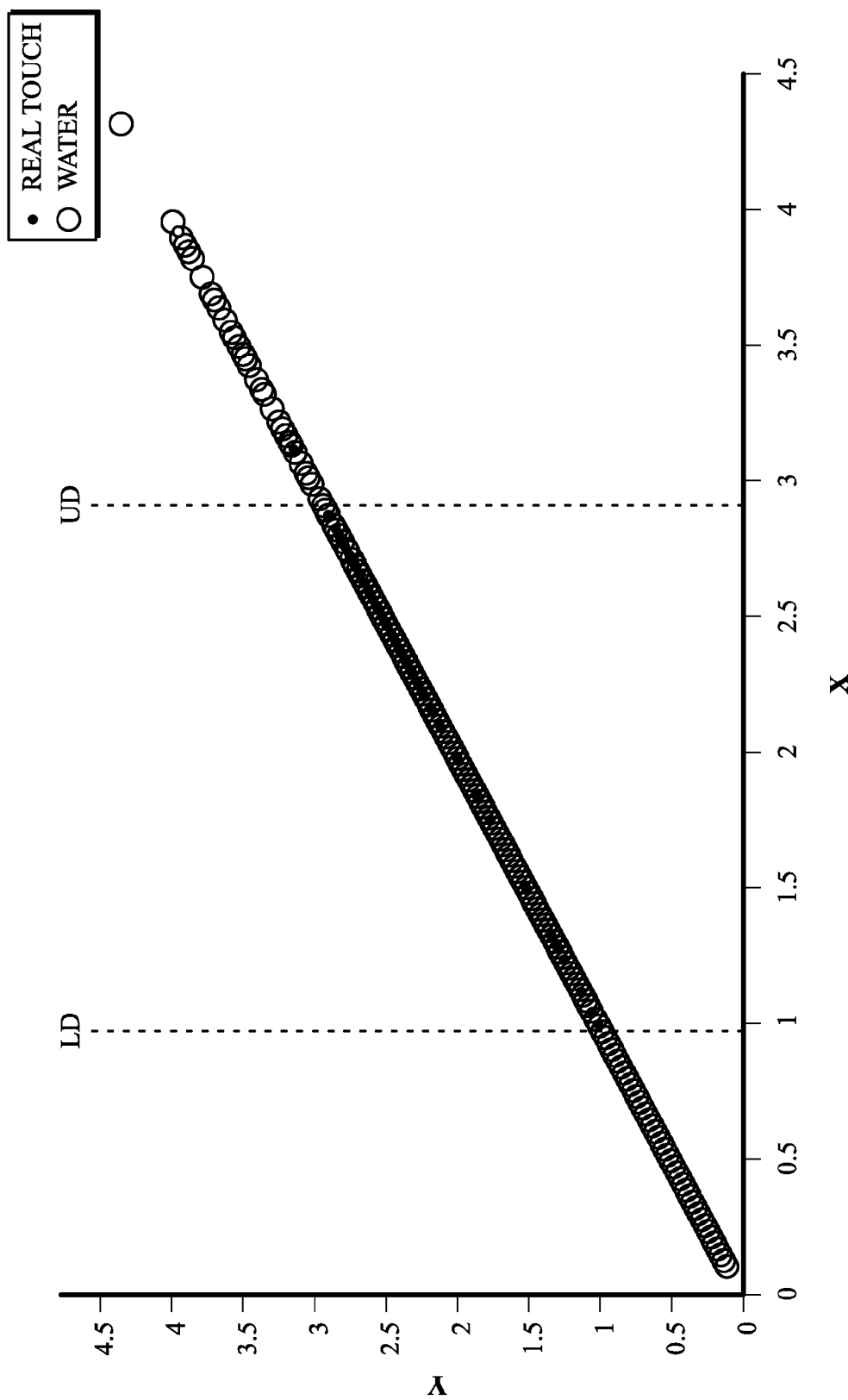
FIG. 10H illustrates an exemplary scatter plot of the relative shape for real touches and water splashes according to examples of the disclosure.

FIG. 10H illustrates an exemplary scatter plot of the relative shape for a real touch and water according to examples of the disclosure. The relative shape can be indicative of the discrepancy calculated from equation (8). As illustrated in the figure, the relative shape of a real touch can be located between a lower bound (LD) and an upper bound (UD) of the amount of discrepancy, whereas the relative shape for water splashes can be scattered throughout.

If a touch is not a cover touch and meets the criteria for at least one of the centroid, radii, and volume of a finger touch, then the microcontroller can send a wake notification to the processor (step 1068), and the processor can unlock the device (step 1070). Otherwise, the device can remain locked (step 1072).

Figure 11:
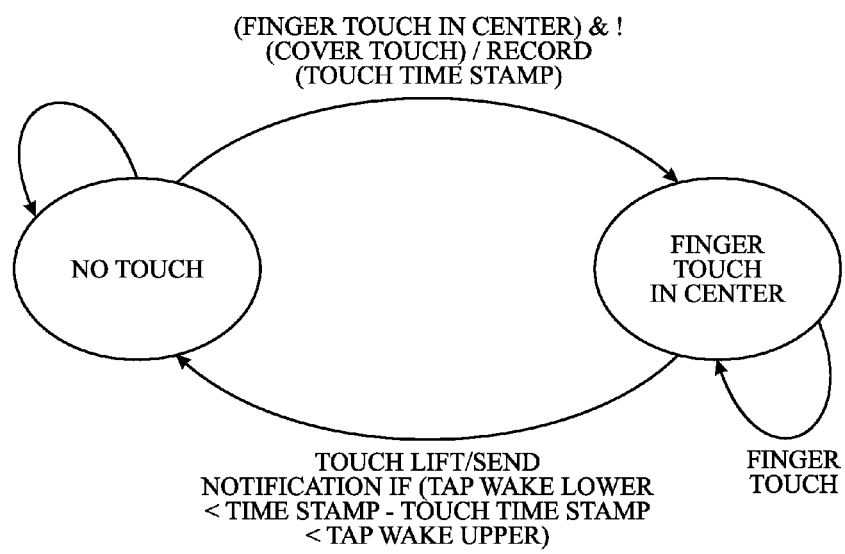
FIG. 11 illustrates an exemplary state machine for recognizing a tap gesture according to examples of the disclosure.

FIG. 11 illustrates an exemplary state machine for recognizing a tap gesture according to examples of the disclosure. The lower bound and the upper bound for the allowed times can be adjusted. In some examples, the lower bound for allowed time can be 16 ms, and the upper bound for the allowed time can be 125 ms. In some examples, the scatter plots (as illustrated above) of real touches and water splashes (or water film) can be adjusted using the lower and upper bounds for allowed time.

With a user finger touching down in the middle of the touch screen, the timestamp can be recorded. Cover touches can be ignored. The microcontroller can loop as long as there is a touch. When the finger is lifted, the duration can be recorded. The microcontroller can determine if the duration is within the time bounds for a tap gesture.

Figure 12:
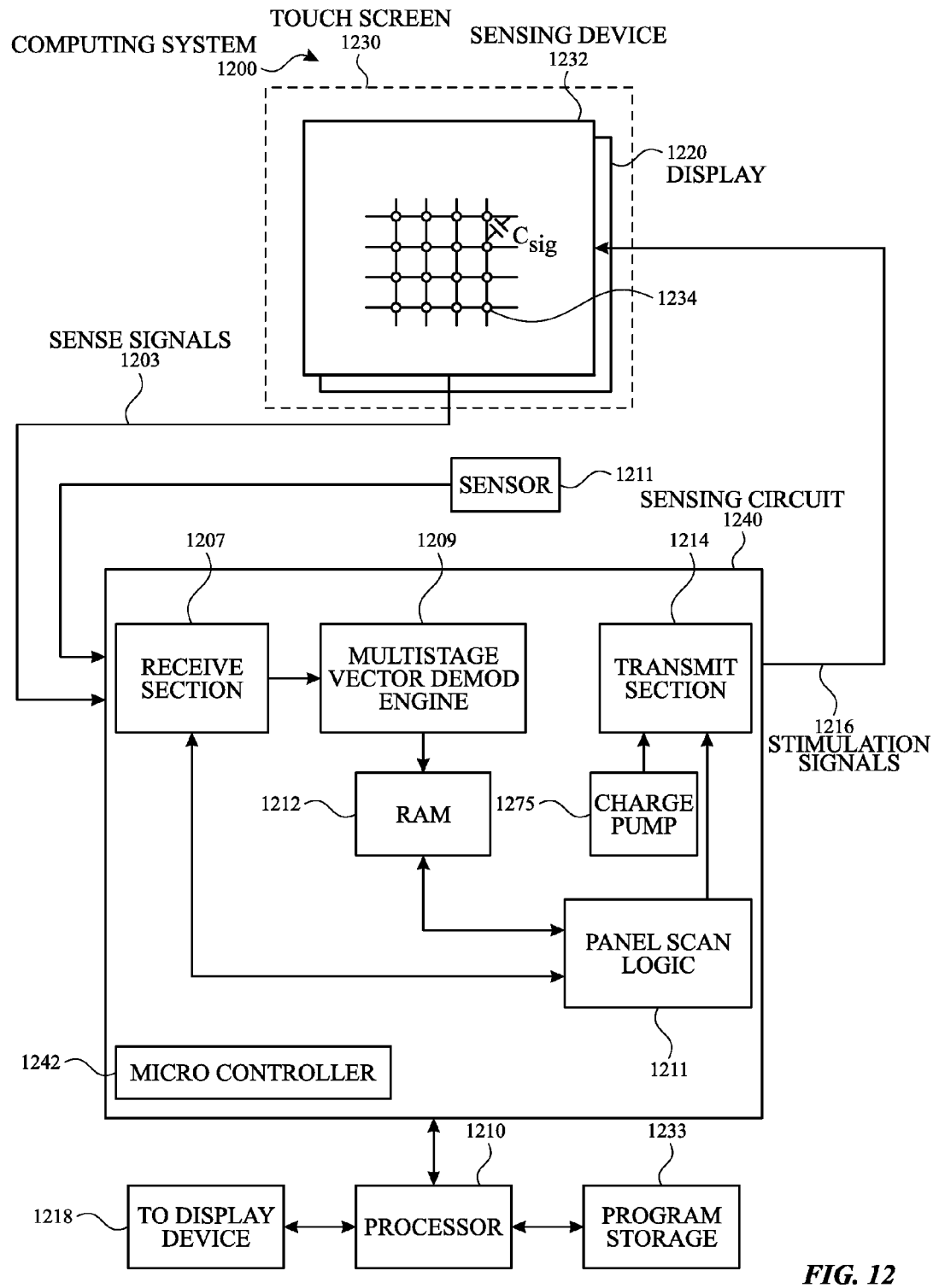
FIG. 12 illustrates an exemplary computing system that can utilize sensing device according to various examples of the disclosure.

FIG. 12 illustrates an exemplary computing system 1200 that can utilize sensing device 1232 according to various examples of the disclosure. Sensing circuit 1240 can be a single application specific integrated circuit (ASIC) that can include one or more microcontrollers 1242, which can include, for example, one or more main processors, such as ARM968 processors, ARM CortexM3 processors, or other processors with similar functionality and capabilities. However, in other examples, some of the processor functionality can be implemented instead by dedicated logic, such as a state machine. Microcontroller 1242 can also include, for example, peripherals such as random access memory (RAM) 1212 or other types of memory or storage, watchdog timers (not shown), and the like. Sensing circuit 1240 can also include, for example, receive section 1207 for receiving signals, such as touch sense signals 1203, from the sense lines of the sensing device 1232 and other signals from other sensors such as sensor 1211, etc. Sensing circuit 1240 can also include, for example, a demodulation section such as multistage vector demod engine 1209, panel scan logic 1211, and a drive system including, for example, transmit section 1214. Panel scan logic 1212 can access RAM 1212, autonomously read data from sense channels, and provide control for the sense channels. In addition, panel scan logic 1211 can control transmit section 1214 to generate stimulation signals 1216 at various frequencies and phases that can be selectively applied to the drive lines of the sensing device 1232.

Charge pump 1215 can be used to generate the supply voltage for the transmit section. Stimulation signals 1216 (Vstim) can have amplitudes higher than the maximum voltage the ASIC process can tolerate by cascading transistors. Therefore, using charge pump 1215, the stimulus voltage can be higher (e.g., 6V) than the voltage level a single transistor can handle (e.g., 3.6 V). Although FIG. 12 shows charge pump 1215 separate from transmit section 1214, the charge pump can be part of the transmit section.

Sensing device 1232 can include a capacitive sensing medium having a plurality of drive lines and a plurality of sense lines. The drive and sense lines can be formed from a transparent conductive medium such as Indium Tin Oxide (ITO) or Antimony Tin Oxide (ATO), although other transparent and non-transparent materials such as copper can also be used. In some examples, the drive and sense lines can be perpendicular to each other, although in other examples other non-Cartesian orientations are possible. For example, in a polar coordinate system, the sensing lines can be concentric circles and the driving lines can be radially extending lines (or vice versa). It should be understood, therefore, that the terms "drive lines" and "sense lines" as used herein are intended to encompass not only orthogonal grids, but the intersecting traces or other geometric configurations having first and second dimensions (e.g., the concentric and radial lines of a polar-coordinate arrangement). The drive and sense lines can be formed on, for example, a single side of a substantially transparent substrate.

At the "intersections" of the traces, where the drive and sense lines can pass adjacent to and above and below (cross) each other (but without making direct electrical contact with each other), the drive and sense lines can essentially form two electrodes (although more than two traces could intersect as well). Each intersection of drive and sense lines can represent a capacitive sensing node and can be viewed as pixel, node, or sensing electrode 1234, which can be particularly useful when sensing device 1232 is viewed as capturing an "image" of touch. (In other words, after sensing circuit 1240 has determined whether a touch event has been detected at each sensing electrode 1234 in the sensing device 1232, the pattern of sensing electrodes 1234 in the multi-touch panel at which a touch event occurred can be viewed as an "image" of touch (e.g. a pattern of fingers touching the panel.) The capacitance between drive and sense electrodes can appear as a stray capacitance when the given row is held at direct current (DC) voltage levels and as a mutual signal capacitance Csig when the given row is stimulated with an alternating current (AC) signal. The presence of a finger or other object near or on the touch sensor panel can be detected by measuring changes to a signal charge Qsig present at the pixels being touched, which is a function of Csig.

Although sensing device 1232 is illustrated as a mutual capacitive touch sensing device, examples of the disclosure can include a self-capacitive touch sensing device. For a self-capacitive touch sensing device, sensing device 1232 can have a plurality of touch pixel electrodes with an inherent self-capacitance to ground associated with it, and also an additional self-capacitance to ground that can be formed when an object is in proximity to or touching one or more touch pixel electrodes. The one or more touch pixel electrodes can be coupled to a sensing circuit. Sensing circuit can include an operational amplifier, a feedback resistor, a feedback capacitor and an input voltage source, although other configurations can be employed. For example, the feedback resistor can be replaced by a switch capacitor resistor. The touch pixel electrodes can be coupled to an inverting input of an operational amplifier. An AC voltage source can be coupled to the non-inverting input of the operational amplifier. The sensing circuit can be configured to sense changes in the total self-capacitance of a touch pixel electrode induced by the object touching (or in proximity to) the touch sensor panel. The output can be used by a processor to determine a presence of a proximity or touch event, or the output can be inputted into a discreet logic network to determine the presence of a touch or proximity event.

Computing system 1200 can also include processor 1210 for receiving outputs from microcontroller 1242 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Processor 1210 can perform additional functions that may not be related to panel processing, and can be coupled to program storage 1233 and display 1220, such as an LCD display, for providing a user interface to a user of the device. In some examples, processor 1210 can be a separate component for sensing circuit 1240, as shown. In other examples, processor 1210 can be included as part of sensing circuit 1240. In other examples, the functions of processor 1210 can be performed by microcontroller 1242 and/or distributed among other components of sensing circuit 1240. Display device 1220 together with sensing device 1232, when located partially or entirely under the sensing device 1232, can form touch screen 1230.

Note that one or more of the functions described above can be performed, for example, by firmware stored in memory (e.g. one of the peripherals) and executed by processor subsystem 1202, or stored in program storage 1232 and executed by processor 1210. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus, or device, a portable computer diskette (magnetic), a random access memory (RAM) (magnetic), a read-only memory (ROM) (magnetic), an erasable programmable read-only memory (EPROM) (magnetic), a portable optical disc such as a CD, CD-R, CD-RW, DVD, DVD-R, or DVD-RW, or flash memory such as compact flash cards, secured digital cards, USB memory devices, memory sticks and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate, or transport the program for use by or in connection with the instruction execution system, apparatus, or device. The transport readable medium can include, but is not limited to, an electronic, magnetic, optical, electromagnetic, or infrared wired or wireless propagation medium.

Figure 13:
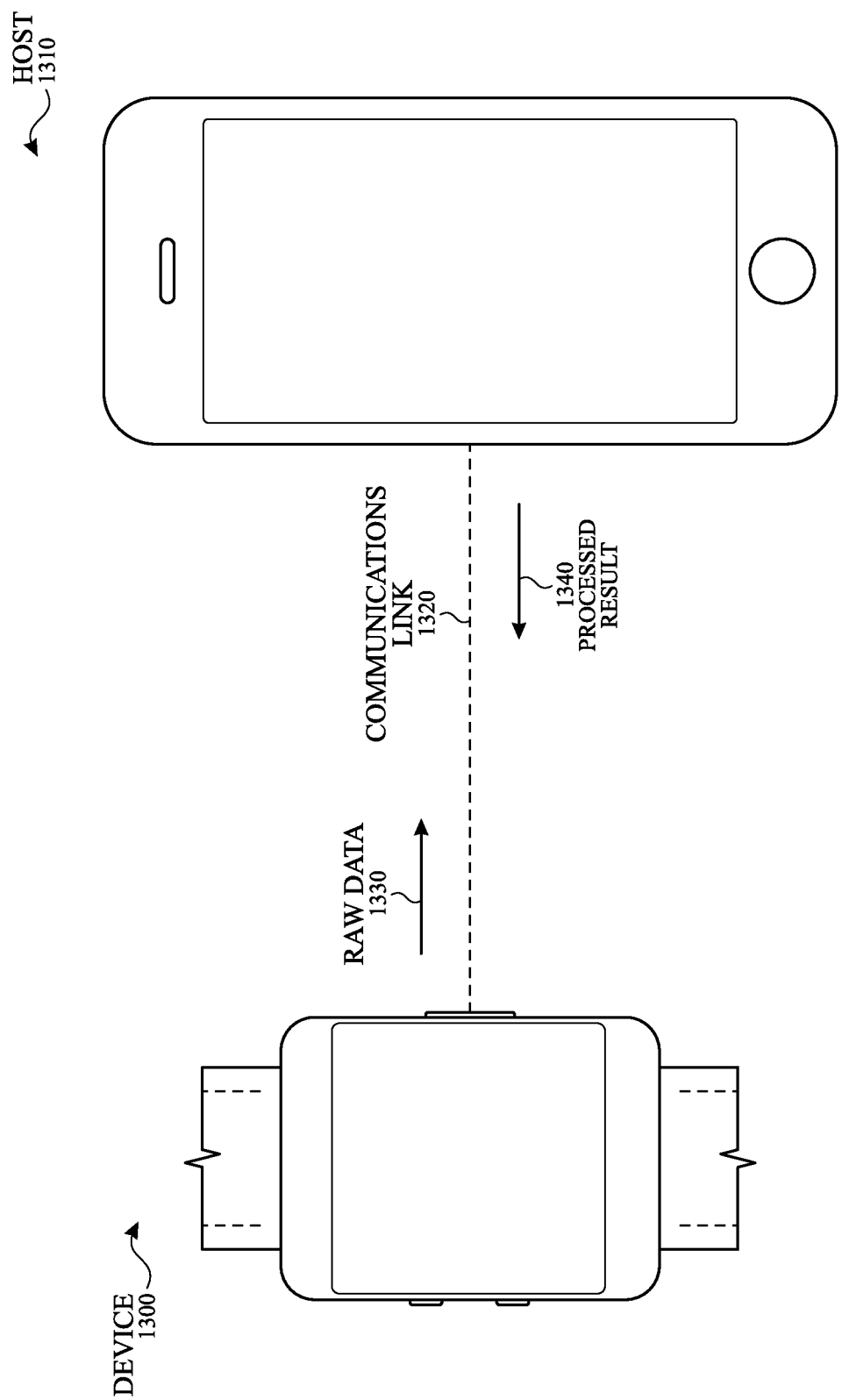
FIG. 13 illustrates an exemplary configuration in which a device is connected to a host according to examples of the disclosure.

In some examples, the microcontroller can receive the touch values and can determine the sequence and one or more gestures. Processing of the touch values, determining the sequence and gestures, and rejecting cover touches and water splashes. In some examples, processing of the touch values and the determination need not be performed on the device itself. FIG. 13 illustrates an exemplary configuration in which a device is connected to a host according to examples of the disclosure. Host 1310 can be any device external to device 1300 including, but not limited to, any of the systems illustrated in FIGS. 1A-1C or a server. Device 1300 can be connected to host 1310 through communications link 1320. Communications link 1320 can be any connection including, but not limited to, a wireless connection and a wired connection. Exemplary wireless connections include Wi-Fi, Bluetooth, Wireless Direct, and Infrared. Exemplary wired connections include Universal Serial Bus (USB), FireWire, Thunderbolt, or any connection requiring a physical cable.

In operation, instead of processing light information from the light sensors on the device 1300 itself, device 1300 can send raw data 1330 measured from the light sensors over communications link 1320 to host 1310. Host 1310 can receive raw data 1330, and host 1310 can process the touch values. Processing the touch values can include determining the sequence and gestures and rejecting cover touches and water splashes. Host 1310 can include algorithms or calibration procedures to adjust the minimum and maximum allowed times for a tap gesture. Additionally, host 1310 can include storage or memory for recording the timestamp, pre-determined thresholds, and upper and lower bounds. Host 1310 can send the processed result 1340 or related information back to device 1300. Based on the processed result 1340, device 1300 can notify the user or adjust its operation accordingly. By offloading the processing and/or storage of the light information, device 1300 can conserve space and power enabling device 1300 to remain small and portable, as space that could otherwise be required for processing logic can be freed up on the device.

A touch sensor panel is disclosed. The touch sensor panel may comprise: a touch controller configured to: capture a touch image when the touch sensor panel is in an idle state; and determine if the touch image exhibits one or more characteristics of a false touch; and a processor configured to: remain in the idle state while the touch controller is capturing a touch image; remain in the idle state while the touch controller is determining if the touch image exhibits the one or more characteristics of the false touch, wherein the processor consumes a greater amount of power in an active state than the touch controller. Additionally or alternatively to one or more examples disclosed above, in other examples, determining if the touch image exhibits one or more characteristics of a false touch comprises: determining a centroid of the touch image; comparing the centroid with a center of the touch sensor panel; and comparing a difference of the centroid with the center of the touch sensor panel to a pre-determined distance value. Additionally or alternatively to one or more examples disclosed above, in other examples, the pre-determined distance value is equal to a size of one touch pixel. Additionally or alternatively to one or more examples disclosed above, in other examples, the size of one touch pixel is equal to 5 mm. Additionally or alternatively to one or more examples disclosed above, in other examples, determining if the touch image exhibits one or more characteristics of a false touch includes determining a radii of the touch image. Additionally or alternatively to one or more examples disclosed above, in other examples, determining if the touch image exhibits one or more characteristics of a false touch includes calibrating the radii to a 10 mm diameter. Additionally or alternatively to one or more examples disclosed above, in other examples, determining if the touch image exhibits one or more characteristics of a false touch further includes comparing the radii to an upper radius value and a lower radius value. Additionally or alternatively to one or more examples disclosed above, in other examples, the upper radius value is equal to 5 mm. Additionally or alternatively to one or more examples disclosed above, in other examples, determining if the touch image exhibits one or more characteristics of a false touch includes determining at least one of a shape and a volume of the touch image. Additionally or alternatively to one or more examples disclosed above, in other examples, determining if the touch image exhibits one or more characteristics of a false touch includes rejecting the touch image when the shape or volume of the touch image is representative of a shape or volume excluding an ellipsoid. Additionally or alternatively to one or more examples disclosed above, in other examples, determining if the touch image exhibits one or more characteristics of a false touch includes generating at least one scatter plot. Additionally or alternatively to one or more examples disclosed above, in other examples, the at least one scatter plot is representative of a centroid position, a radii, or a relative shape of the touch image. Additionally or alternatively to one or more examples disclosed above, in other examples, the touch controller is further configured to reject the touch image when one or more touch values associated with the touch image is located outside one or more bounds of the scatter plot. Additionally or alternatively to one or more examples disclosed above, in other examples, the one or more bounds is determined by a calibration procedure. Additionally or alternatively to one or more examples disclosed above, in other examples, determining if the touch image exhibits one or more characteristics of a false touch includes: determining a time associated with the touch image; determining a difference between the time and a timestamp; and rejecting the touch image when the difference is greater than a pre-determined value. Additionally or alternatively to one or more examples disclosed above, in other examples, the false touch is generated by water.

A method for switching a device from an idle state to an active state is disclosed. The method may comprise: capturing a touch image using a controller, while maintaining a processor in the idle state, wherein the processor consumes a lower amount of power in the active state than the controller consumes in the active state; determining if the touch image exhibits one or more characteristics of a false touch using the controller, while keeping the processor in the idle state; and maintaining the processor in the idle state when the controller determines that the touch image exhibits the one or more characteristics of the false touch. Additionally or alternatively to one or more examples disclosed above, in other examples, the method further comprises: determining a centroid of the touch image; comparing the centroid to the center of the device; and comparing a difference of the centroid with the center of the device to a pre-determined distance value. Additionally or alternatively to one or more examples disclosed above, in other examples, the method further comprises: determining a radii of the touch image; and comparing the radii to an upper radius value and a lower radius value. Additionally or alternatively to one or more examples disclosed above, in other examples, the method further comprises: determining at least one of a shape and a volume of the touch image; and comparing the shape to an ellipsoid.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A touch sensor panel comprising:
   a touch screen;
   a touch controller configured to:
   capture a touch image from the touch screen when the touch sensor panel is in an idle state;
   determine a distance between a centroid of a touch of the touch image to a center of the touch screen;
   compare the distance to a pre-determined distance value;
   determine if the touch exhibits one or more characteristics of a false touch; and
   transmit a wake notification to a processor of the touch sensor panel if the touch controller determines the distance is less than the pre-determined distance value and the touch does not exhibit the one or more characteristics of a false touch;
   wherein:
   the processor is configured to:
   remain powered down while the touch sensor panel is in the idle state and the touch controller is capturing the touch image,
   remain powered down while the touch sensor panel is in the idle state and the touch controller is determining if the touch exhibits the one or more characteristics of a false touch, and
   remain powered down if the touch controller determines that the distance is greater than the pre-determined distance value or the touch controller determines the touch exhibits at least one of the one or more characteristics of a false touch,
   the touch sensor panel transitions to the active state in response to the processor receiving the wake notification from the touch controller; and
   the processor consumes a greater amount of power than the touch controller when the touch sensor panel is in the active state.

2. The touch sensor panel of claim 1, wherein the pre-determined distance value is equal to a size of one touch pixel.

3. The touch sensor panel of claim 2, wherein the size of one touch pixel is equal to 5 mm.

4. The touch sensor panel of claim 1, wherein determining if the touch exhibits one or more characteristics of a false touch includes determining a radii of the touch.

5. The touch sensor panel of claim 4, wherein determining if the touch exhibits one or more characteristics of a false touch further includes calibrating the radii to a 10 mm diameter.

6. The touch sensor panel of claim 4, wherein determining if the touch exhibits one or more characteristics of a false touch further includes comparing the radii to an upper radius value and a lower radius value.

7. The touch sensor panel of claim 6, wherein the upper radius value is equal to 5 mm.

8. The touch sensor panel of claim 1, wherein determining if the touch exhibits one or more characteristics of a false touch includes determining at least one of a shape and a volume of the touch.

9. The touch sensor panel of claim 8, wherein determining if the touch exhibits one or more characteristics of a false touch includes rejecting the touch when the shape or volume of the touch is representative of a shape or volume excluding an ellipsoid.

10. The touch sensor panel of claim 1, wherein determining if the touch exhibits one or more characteristics of a false touch includes generating at least one scatter plot.

11. The touch sensor panel of claim 10, wherein the at least one scatter plot is representative of a position of the centroid, a radii, or a relative shape of the touch.

12. The touch sensor panel of claim 10, wherein the touch controller is further configured to reject the touch when one or more touch values associated with the touch is located outside one or more bounds of the scatter plot.

13. The touch sensor panel of claim 12, wherein the one or more bounds is determined by a calibration procedure.

14. The touch sensor panel of claim 1, wherein determining if the touch exhibits one or more characteristics of a false touch includes:
 determining a time associated with the touch;
 determining a difference between the time and a timestamp; and
 rejecting the touch when the difference is greater than a pre-determined difference value.

15. The touch sensor panel of claim 1, wherein the false touch is generated by water.

16. A method for switching a device from an idle state to an active state, the method comprising:
 capturing a touch image from a touch screen using a controller, while maintaining a processor powered down while the device is in the idle state, wherein the processor consumes a greater amount of power than the touch controller when the device is in the active state;
 determining a distance between a centroid of a touch of the touch image to a center of the touch screen;
 comparing the distance to a pre-determined distance value;
 determining if the touch exhibits one or more characteristics of a false touch using the controller, while keeping the processor powered down while the device is in the idle state;
 transmitting, with the controller, a wake notification to the processor if the controller determines the distance is less than the pre-determined distance value and the touch does not exhibit the one or more characteristics of a false touch;
 maintaining the processor powered down while the device is in the idle state and the controller is capturing the touch image;
 maintaining the processor powered down while the device is in the idle state and the controller determines that the touch exhibits the one or more characteristics of the false touch;
 maintaining the processor powered down while the device is in the idle state if the controller determines that the distance is greater than the pre-determined distance value or the controller determines the touch exhibits at least one of the one or more characteristics of a false touch; and
 transitioning the device to the active state in response to the processor receiving the wake notification from the controller.

17. The method of claim 16, further comprising:
 determining a radii of the touch; and
 comparing the radii to an upper radius value and a lower radius value.

18. The method of claim 16, further comprising:
 determining at least one of a shape and a volume of the touch; and
 comparing the shape to an ellipsoid.

* * * * *